(12) United States Patent
Yuen et al.

(10) Patent No.: US 7,333,611 B1
(45) Date of Patent: Feb. 19, 2008

(54) ULTRA-SECURE, ULTRA-EFFICIENT CRYPTOGRAPHIC SYSTEM

(75) Inventors: Horace P. Yuen, Glenview, IL (US);
Prem Kumar, Skokie, IL (US);
Geraldo A. Barbosa, Franklin, TN (US)

(73) Assignee: Northwestern University, Evanston, IL (US)

( * ) Notice: Subject to any disclaimer, the term of this patent is extended or adjusted under 35 U.S.C. 154(b) by 659 days.

(21) Appl. No.: 10/674,241

(22) Filed: Sep. 29, 2003

Related U.S. Application Data

(60) Provisional application No. 60/414,282, filed on Sep. 27, 2002.

(51) Int. Cl.
*H04L 9/00* (2006.01)
(52) U.S. Cl. .................................... 380/256
(58) Field of Classification Search ............... 380/256
See application file for complete search history.

(56) References Cited

U.S. PATENT DOCUMENTS

| | | | |
|---|---|---|---|
| 5,243,649 A | | 9/1993 | Franson |
| 5,307,410 A | | 4/1994 | Bennett |
| 5,515,438 A | | 5/1996 | Bennett et al. |
| 5,675,648 A | * | 10/1997 | Townsend ............... 380/278 |
| 5,850,441 A | | 12/1998 | Townsend et al. |
| 5,953,421 A | | 9/1999 | Townsend |
| 6,271,946 B1 | | 8/2001 | Chang et al. |
| 6,272,224 B1 | | 8/2001 | Mazourenko et al. |
| 6,683,958 B2 | | 1/2004 | Petrovic |
| 6,748,081 B1 | * | 6/2004 | Dultz et al. ............. 380/277 |
| 6,885,779 B2 | | 4/2005 | Keys et al. |
| 2002/0106084 A1 | | 8/2002 | Azuma et al. |
| 2003/0002670 A1 | | 1/2003 | Wang |

OTHER PUBLICATIONS

Schneier, Bruce "Applied Cryptography Protocols, Algorithms, and Source Code in C" second edition; pp. 270-278, 1996.*
Gisin, N., Ribordy, G., Tittel, W. . . . , Zbinden, H. "Quantum Cryptography," Reviews of Modern Physics. vol. 74, pp. 145-195, 2002.
Barbosa, G., Corndorf, E., Kumar, P., Yuen, H. "Secure Communication Using Mesocopic Coherent States," Physics Review Letters, vol. 90, 2003.
Corndorf, E., Barbosa, G., Liang, C., Yuen, H., Kumar, P. "High-Speed Data Encryption Over 25km of Fiber by Two-Mode; Coherent-Stale Quantum Cryptography," Optics Letters, vol. 28, pp. 2040, 2003.

(Continued)

*Primary Examiner*—Gilberto Barron
*Assistant Examiner*—Devin Almeida

(57) ABSTRACT

A method and system for achieving the cryptographic objectives of data encryption and/or key expansion/generation by utilizing a short, shared, secret seed key between two parties that is extended to a long extended key which, in turn, is used to select one of many possible quantum and/or classical signal sets. The signal strength of each signal in the signal set is adjusted in accordance with the number of signal sets to obtain the necessary security level. The system operates with whatever signal quantum noise and other system noises are present while preserving security of the cryptographic system. The signal quantum noise and system noises protect both the data and the key from attackers.

45 Claims, 14 Drawing Sheets

OTHER PUBLICATIONS

Corndorf, E., Kanter, G.S., Liang, C., Kumar, P. "Quantum-Noise Protected Data Encryption for WDM Networks," Presented at the Conference on Lasers and Electro-Optics (CLEO '2004), San Francisco, CA, May 16-21, 2004; paper CPDDS.

Corndorf, E., Liang, C. Kanter, G.S., Kumar, P., Yuen, H.P. "Quantum-Noise-Protected Data Encryption for WDM Fiber-Optic Networks," ACM Computer Communication Review: Special Section on Impact of Quantum Technologies on Networks and Networking Research, vol. 28, Oct. 2004.

Yuen, H. "KCQ: A New Approach to Quantum Cryptography I. General Principles and Qubit Key Generation," Quant-ph/0311061. 2003.

Corndorf, E., Kumar, P., Liang, C., Barbosa, G., Yuen, H.P. "Efficient Quantum Cryptography with Coherent-State Light in Optical Fibers at Gbps Rates," In Proceedings of the SPIE Annual Conference, San Diego, CA, Aug. 2003.

Zierler, N., Brillhart, J. "On Primitive Trinomials (mod 2)," Journal of Information and Control, vol. 15, pp. 541-544, 1968.

Calsamiglia, John; Barnett, Stephen M.; Lutkenhaus, Norbert. Conditional beam-splitting attack on quantum key distribution. Physical Review, 2001, 65:012312-1-012312-12.

Yuen, Horace P. Quantum versus classical noise cryptography. Northwestern University, 2000, pp. 399-404.

Yuen, Horace P.; Kim, Ajung M. Classical noise-based cryptography similar to two-state quantum cryptography. Physics Letters A, 1998, 241:135-138.

Yuen, Horace P. Anonymous key quantum cryptography and unconditionally secure quantum bit commitment. Northwestern University, 2000, pp. 1-11.

Yuen, Horace P. Unconditionally secure quantum bit commitment is possible. Northwestern University, 2000, pp. 1-41.

Barbosa, Geraldo A.; Corndorf, Eric; Kumar, Prem; Yuen, Horace P. Secure communication using coherent states. Northwestern University, 2002, pp. 1-4.

Barbosa, Geraldo A.; Corndorf, Eric; Kumar, Prem; Yuen, Horace P. Quantum cryptography in free space with coherent-state light. Northwestern University, 2002, pp. 1-11.

Barbosa, Geraldo A.; Corndorf, Eric; Kumar, Prem; Yuen, Horace P. Secure communication using mesoscopic coherent states. Physical Review Letters, 2003, 90:227901-1-227901-4.

Kumar, Prem; Yuen, Horace P. Slides for SPIE Annual Meeting, Seattle, WA. Jul. 11, 2002.

Yuen, Horace P.; Kumar, Prem. Slides for DARPA QuIST Review, Cambridge, MA, Sep. 9-13, 2002.

* cited by examiner

Alice and Bob expand keys
from a short secret key

Quantum noise protects
data from Eve

FIG. 7
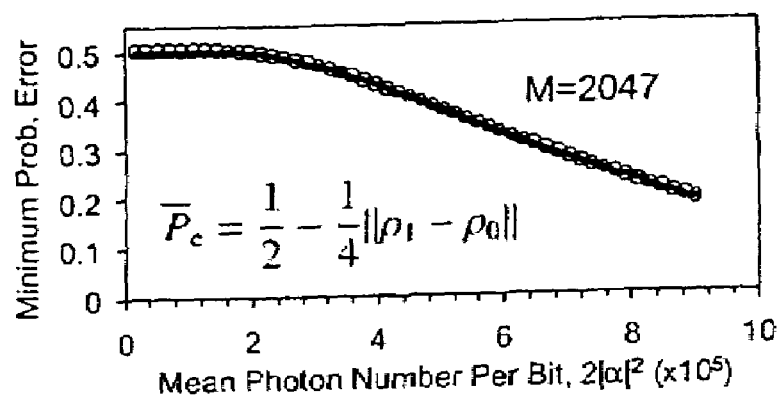
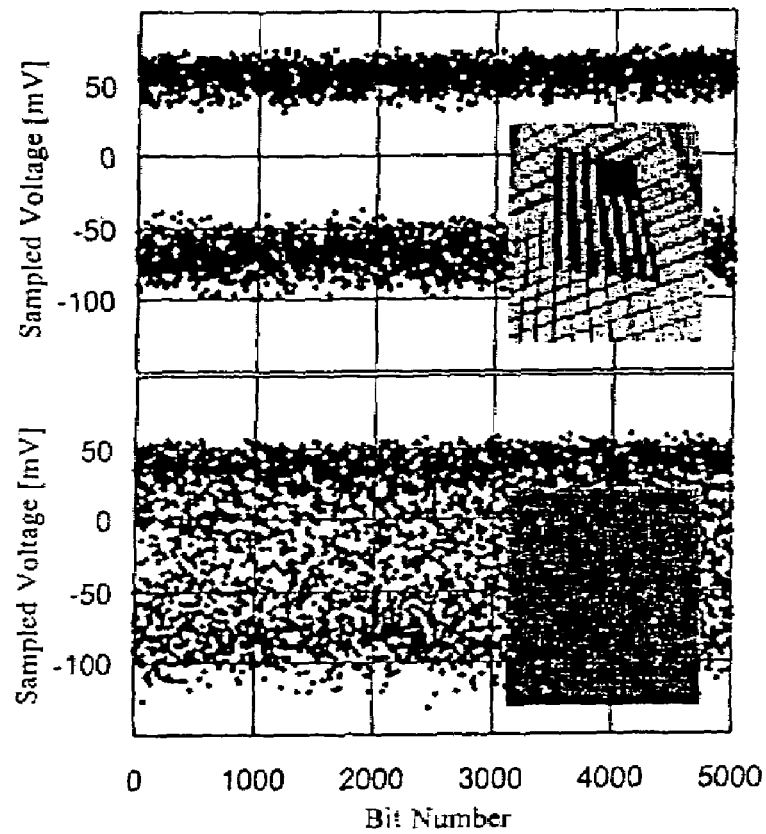
FIG. 8
FIG. 9

Eve's uncertainty in θ arises from independent measurements

M agreed-upon bases choices

FIG. 13
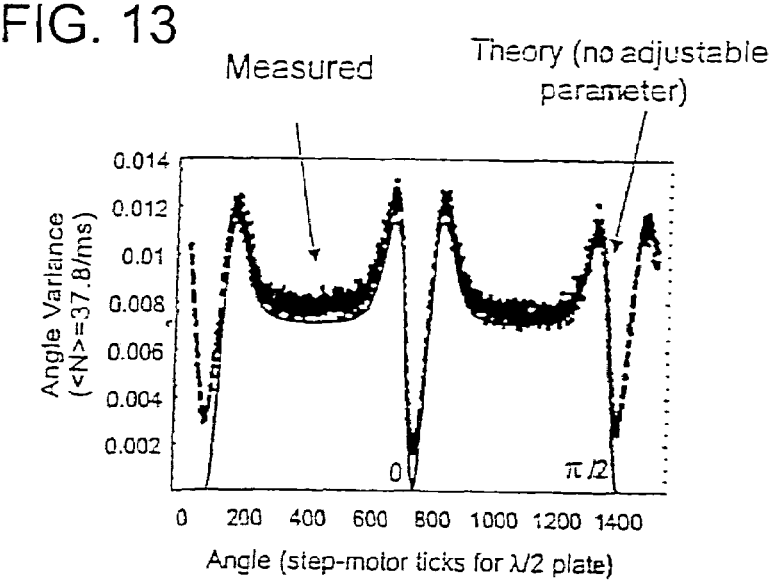
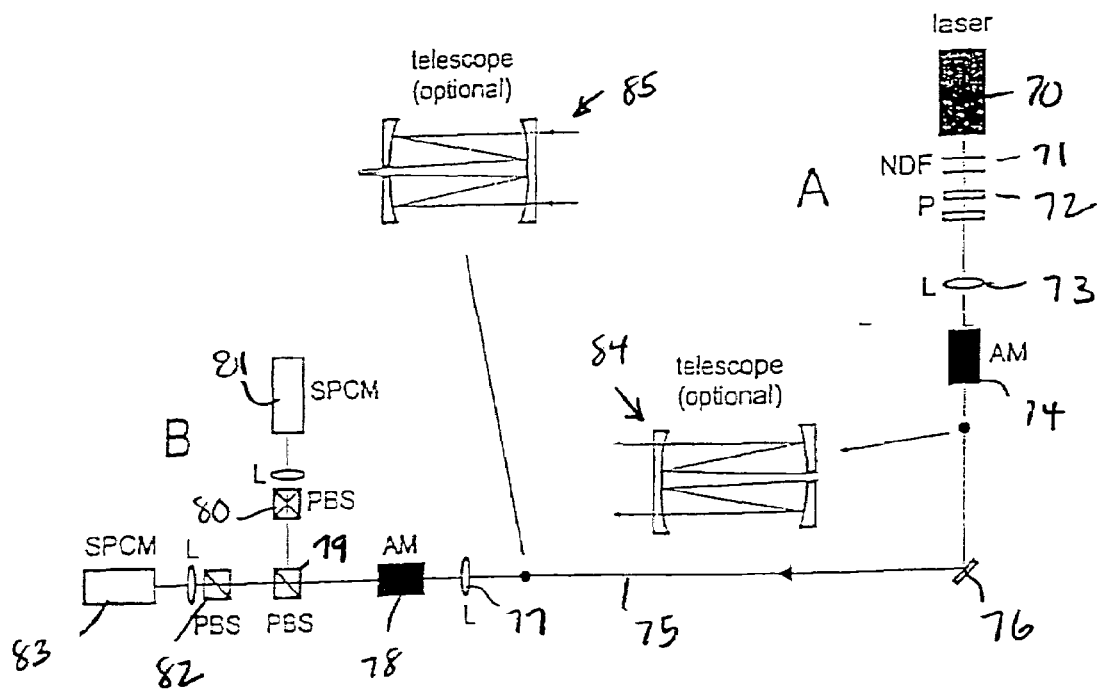
FIG. 14

FIG. 15
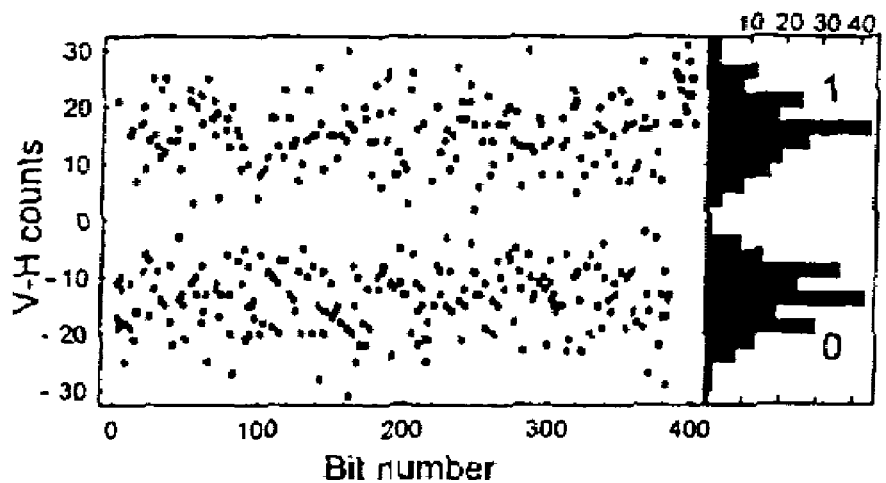
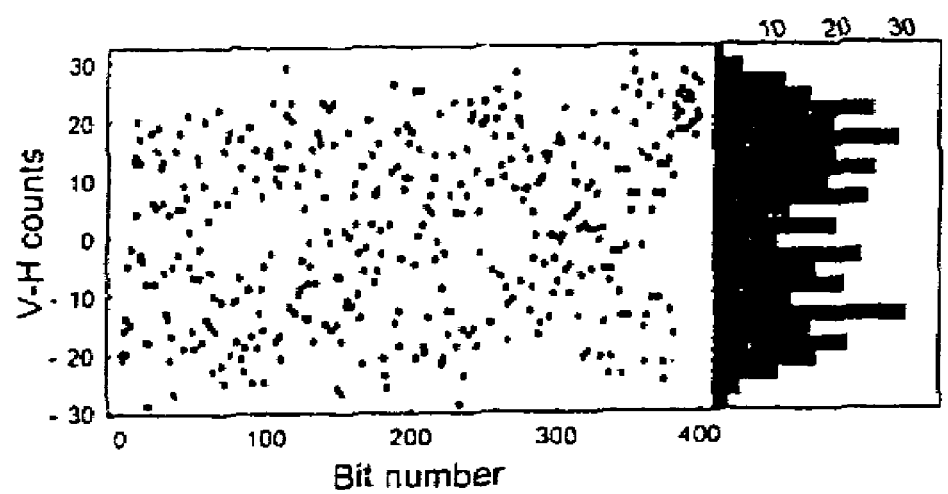
FIG. 16

Alice to Bob, -40dBm (4,000 photons/bit)

Alice to Eve, -40dBm (4,000 photons/bit)

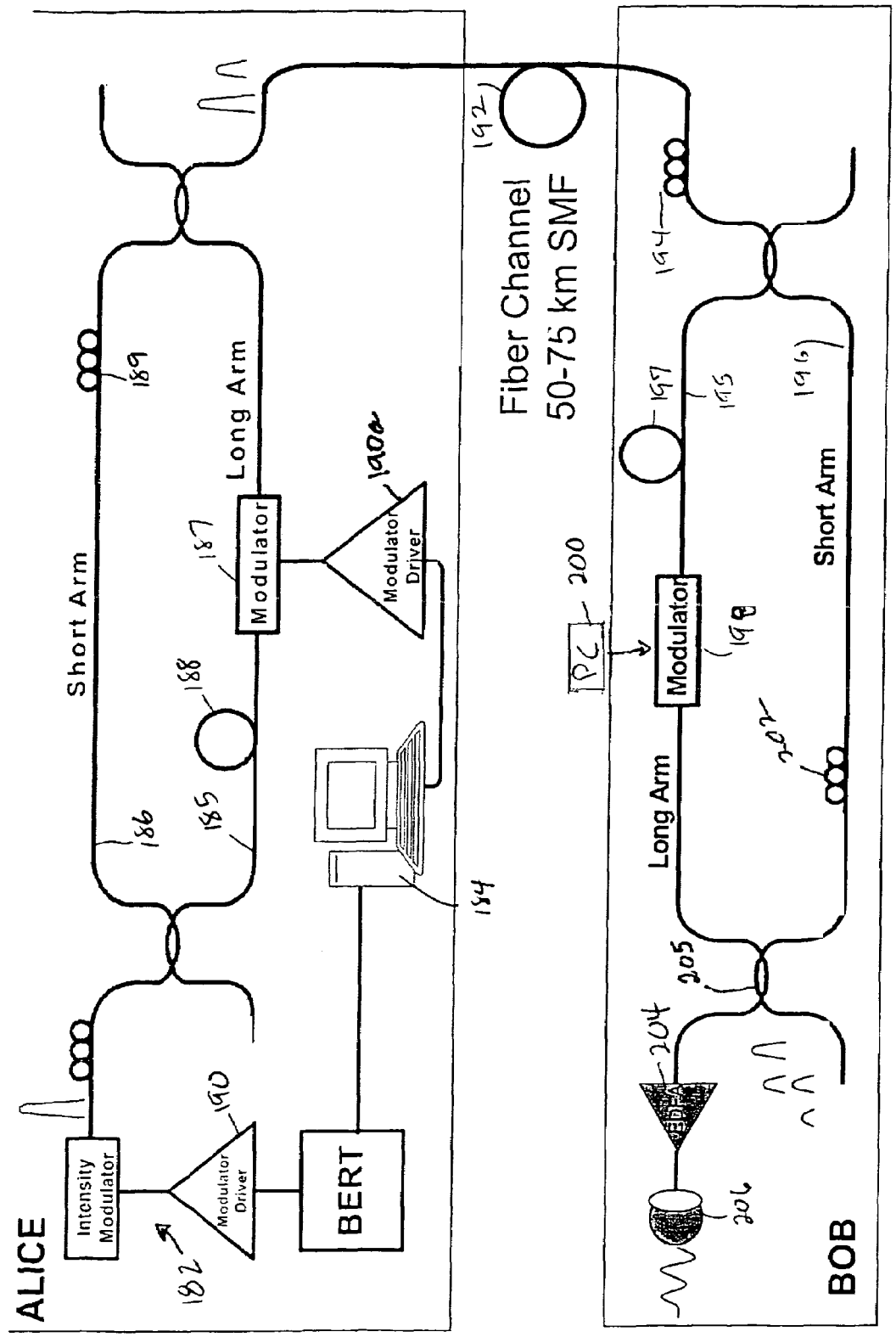

ULTRA-SECURE, ULTRA-EFFICIENT CRYPTOGRAPHIC SYSTEM

CROSS REFERENCE TO RELATED APPLICATION

This application claims priority of provisional application Ser. No. 60/414,282, which is entitled "Ultra-Secure, Ultra-Efficient Cryptographic System", and which was filed on Sep. 27, 2002, the entirety of which is hereby incorporated herein by reference.

STATEMENT REGARDING FEDERALLY SPONSORED RESEARCH

The United States Government has certain rights to this invention pursuant to Grant Nos. F30602-01-2-0528 and F30602-99-1-0554) from the Defense Advanced Research Projects Agency (DARPA) to Northwestern University.

BACKGROUND OF THE INVENTION

Field of the Invention

The present invention relates generally to information security, and more particularly to a method and system for achieving cryptographic objectives of data encryption and key expansion/generation.

Problems associated with information security have become a major issue in this still emerging openly accessible information society. While cryptography is an indispensable tool in addressing such problems, there are both questions of security and efficiency with the standard cryptographic techniques. The usual cryptographic algorithms utilizing private keys have yet to catch up with the data speed of the Internet fiber backbone, not to mention the projected increase of the fiber data rates in the future. The ones utilizing dual keys are even much slower. The private key algorithms, including DES and AES, are not proved to be secure against all attacks within their key-size limits. The public-key algorithms all rely on the presumed complexity of certain computational problems. Both types of algorithms are vulnerable to advances in computer technology, especially if a quantum computer becomes available. Additional problems arise in their use in a network environment, including key management issues as well as the usefulness and design of the public-key infrastructure.

The currently available quantum cryptographic techniques, based primarily on the well known Bennett-Brassard (BB84) techniques, have many intrinsic limitations that make them too slow and impractical for long-distance or network communications.

For the encryption of data with perfect secrecy that cannot be broken with any advance in technology, one may, in principle, employ a one-time pad with a secret key obtained by Bennett-Brassard quantum cryptographic technique for key expansion. Such an approach may be possible; however, it is slow and inefficient because the key length needs to be as long as the data, and it also requires a nearly ideal quantum communication line that is difficult to obtain in long distance commercial systems such as the Internet core. On the other hand, for both military and commercial applications, there are great demands for secret communications that are fast and secure but not necessarily perfectly secure. There are many practical issues, human as well machine based, that would make theoretical perfect security in specific models not so important in real life.

The key lengths of traditional cryptographic algorithms are chosen such that current computers using the best known cracking algorithms will require an unreasonable amount of time to break the cipher. While some algorithms generate keys and/or ciphertext that appear to be secure through computational complexity, only in degenerate cases can any information-theoretic analysis of security be performed. The end result is that cipher cracking algorithms may exist that are much more powerful than a cryptographic protocol is provisioned for. Armed with the inherent measurement uncertainty of non-orthogonal quantum states, several proposals have been put forward offering quantum effects as cryptographic mechanisms. The most famous of these proposals was made by Bennett and Brassard in their BB84 protocol. See, for example, "Quantum cryptography: public-key distribution and coin tossing" by C. H. Bennett and Brassard, *Proceedings of the IEEE International Conference on Computers on Computers, System and Signal Processing*, Bangalore India pp. 175-179 1984 (hereinafter "BB84") In this scheme, two parties are able to remotely agree on a string of binary random numbers known only to each other. These random numbers are stored by the users for later use as either a) keys in traditional (classical) cryptographic algorithms, or b) as a running-key for a public Vernam cipher (one-time pad).

While the Vernam cipher does provide provable information-theoretic security on public channels, it is inefficient in the sense that every bit of data to be ciphered requires one bit of the BB84 generated key. This means that the encrypted data transmission rate is limited to the BB84 key generation rate. Due to technical and physical limitations, current implementations of BB84 have much lower key generation rates than available classical data rates.

One of the major technical problems limiting BB84's key generation rate (more importantly, BB84's rate-distance product) is the protocol's requirement of single-photon number states. This requirement is a burden not only in the generation of such states, but also in that such states are acutely susceptible to loss, are not optically amplifiable (in general), and are difficult to detect at high rates (greater than 1 MHz).

Many applications, including one-time pad data encryption and significant simplification in key management, would result if new keys can be readily created between two users, a process called key distribution or "key expansion" or "key generation" in the quantum cryptography literature. The requirements are that the new key is fresh, it is totally random to anyone who does not know the other relevant keys involved at the time the new key is established, and that the process is "unconditionally secure", secure given the laws of physics, and thus not vulnerable to future advances in technology. Public-key techniques based on computational complexity assumptions are thus not unconditionally secure, nor are the standard key expansions from a master key.

There are two known related techniques for unconditionally secure key expansion: utilization of noise and quantum cryptography. In the presence of noise, it has been shown information-theoretically in references "The Wire-Tap Channel", A. D. Wyner, *Bell System Technical Journal*, vol. 54 pp. 1355-1387, 1975; "Broadcast Channels With Confidential Messages", I. Csiszar and J. Korner, IEEE Transactions on Information Theory, vol. 24, pp. 339-348, 1978; and "Secret Key Agreement By Public Discussion From Common Information", U. M. Maurer, *IEEE Transactions on Information Theory*, vol. 39 pp. 733-742, 1993, that new shared secret keys can be created between two users, and a specific protocol has been proposed for such purpose. The other known technique is, the well-known Bennett-Brassard, as described in BB84. These techniques suffer from the intrinsic limitation that very weak signals with no more than one photon per mode have to be used, and thus are severely rate-limited in a lossy channel.

Another system is disclosed in U.S. Pat. No. 5,515,438, which is a variant of the BB84 system and involves features of the system described in "Quantum Cryptography Using Any Two Non-Orthogonal States", C. H. Bennett, *Physics Review Letters*, vol. 68, pps. 3121-3124, 1992, where coherent states instead of number states are employed. This system uses macroscopic signals. However, there is microscopic difference between 0 bit and the 1 bit. There is a difference between what on average Bob sees and what Eve sees. But according to detection, theory, it is not the average intensity in each of the bit signals that matters, it is the difference between them versus the interference. Furthermore, no shared secret key is explicitly used by the sender and the receiver in their photon channel.

SUMMARY OF THE INVENTION

The disadvantages and limitations of the background art discussed above are overcome by the present invention. With this invention, there is provided a method and protocol for achieving the cryptographic objectives of data encryption and/or key expansion/generation by utilizing a short, shared, secret seed key between two parties that is used to select (determine) one of many possible quantum and/or classical signal sets. The signal strength of each signal in the signal set is adjusted in accordance with the number of signal sets to obtain the necessary security level. The system operates with whatever signal quantum noise and other system noises are present in the cryptosystem.

Thus, in the method and system provided by the present invention, a short, shared secret key is explicitly used and quantum noise hides both the data bits and the key. A software or hardware-based mechanism is used to extend the seed key to a long running key for use in data encryption. The signal sets can be embodied in any number of modes of electromagnetic or acoustic or other physical origins. The quantum and/or classical noise in the system prevents an attacker from success and the shared, secret key between the first and second parties allows them to encrypt/decrypt messages.

Moreover, the present invention provides secure communication using low (microscopic) to intermediate (mesoscopic) to large (macroscopic) energy coherent states. The possible use of relatively high energy states allows encrypted signals to be passed through amplifiers, splitters, arrayed waveguide grating (AWG) devices, dispersion compensating modules (DCMs) and other network elements. Accordingly, the encryption schemes provided by the present invention can be used in all types of networks, including enterprise, metro, short haul and long haul networks. In addition, the schemes are independent of underlying software protocols that are currently in use for managing data traffic.

The present invention provides new optical and quantum techniques for the usual cryptographic objectives of encryption, key distribution, and authentication, that can be implemented with currently available optical technology. In contrast to other known quantum techniques, the methods of the invention are applicable to optical networks involving amplifiers, routers, and substantial path loss. The methods of the invention offer the potential of achieving greatly improved efficiency and security over those provided by currently available technologies. The application of the methods of the invention to the Internet can greatly ease the problems of secure network control and may facilitate the creation of truly secure virtual private networks, in addition to offering new security services, such as those involving multi-party protocols.

More specifically, the present invention provides a method for encrypting data, the method comprising the steps of generating a large number of quantum signal sets of low to high energy; and modulating the sets of quantum signals with the data being encrypted by using a multi-bit seed key to select quantum signal sets for different bit values, whereby each quantum signal set is encoded into a coherent state of an infinite-dimensional space.

The efficiency/security problems of known prior art schemes are overcome by the technique of the present invention in which low to large-energy coherent states, the usual laser outputs, are employed. This overcomes loss and, as is stated above, allows ordinary amplification, switching and routing, for example, of the encrypted signals. In addition to the fundamentally unavoidable quantum noise in coherent states, the technique of the present invention uses a shared secret key K for data encryption, authentication and key expansion/generation.

Further in accordance with the invention, there is provided a method for encrypting data.

The method includes providing a multi-bit seed key; extending the multi-bit seed key K to produce a multi-bit extended key K', the length of the extended key being substantially greater than the length of the seed key K; segmenting the extended key K' into a plurality of disjointed sub-blocks of r-bit running keys R; and modulating a signal using running keys R to select different signal values for the different bit values to thereby encrypt the signal with the data.

One crucial element for obtaining security in the method disclosed by Bennett and Brassard (BB84) involves the detection of small intrusion on weak signals, which is difficult to achieve in a network environment. This problem is alleviated by the present invention wherein quantum signal sets of higher energy are selected for different bit values by a secret key shared between a sender and a receiver. It is important to remember that some shared secret key is needed in the system disclosed by Bennett and Brassard (BB84) for message authentication during protocol execution. The resulting scheme is acceptable as key expansion if the new key is secure even if the shared secret key is known to the attacker after the user communications are completed. When a secret key is used to identify the signal set, it would be a secret CDMA (code division multiple access) scheme classically, which does not allow key expansion because the user and the attacker have the same observation.

The present invention also provides a cryptographic scheme, that uses the inherent quantum noise in two-mode coherent states of light as a data encryption mechanism. Unlike single-photon number states, two-mode coherent states are easily generated, easily detected, optically amplifiable, and are loss tolerant. A legitimate receiver, with use of a short, shared, secret key makes an optimal quantum measurement of every transmitted bit. An eavesdropper, on the other hand, who does not possess the secret key, is subject to an irreducible quantum uncertainty in each measurement of every transmitted bit, even with the use of ideal, lossless detectors. Modulating a finite set of orthogonal polarization states (two-mode states), the present invention provides secure data encryption through 25 km of standard fiber at 250 Mbps using commercial off-the-shelf components.

DESCRIPTION OF THE DRAWINGS

These and other advantages of the present invention are best understood with reference to the drawings, in which:

FIG. 7 is a graph of minimum probability of bit error for Eve as a function of the mean number of photons per bit for a given M;

FIG. 8 shows a sequence of bits corresponding to a digital photo of an American flag transmitted from Alice to Bob using the embodiment shown in FIG. 6;

FIG. 9 shows the same sequence of bits as seen by Eve;

FIG. 13 is a graph showing error in polarization-angle measurements for the system of FIG. 9;

FIG. 14 is a schematic of a free-space cryptography system provided by the invention;

FIG. 15 shows a sequence of bits transmitted from Alice to Bob using the system of FIG. 14;

FIG. 16 shows the same sequence of bits as intercepted by Eve;

FIG. 27 is a schematic of a time-mode optical cryptography system provided by the present invention.

DETAILED DESCRIPTION OF THE PREFERRED EMBODIMENTS

Figure 1:
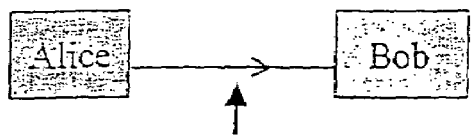
FIG. 1 is a block diagram of an encryption system employing shared secret keys in accordance with the present invention.

Referring to FIG. 1 of the drawings, there is shown a simplified representation of a communication system. The locations A and B of two parties, conventionally referred to as "Alice" and "Bob", wishing to share secret information, are interconnected by a communication link. As will be shown, Alice and Bob extend keys from a short shared secret seed key. An eavesdropper, conventionally referred to as "Eve", cannot succeed if she tries to tap the information because quantum noise protects the information from Eve.

In accordance with the invention, key expansion or key generation is provided using a shared secret seed key K. Alice and Bob extend a shared, relatively short secret seed key K to produce a larger extended key K' for encrypting information that is to be shared by Alice and Bob over the communication link. By way of example, the length of the shared secret seed key K that is used in producing the larger extended key K' can be 256 bits or 512 bits or 1024 bits, for example. The length of the resulting larger extended key K' is exponential, base 2 to the sth power, where s is the length (i.e., number of bits) of the shared secret seed key. The procedure of obtaining a larger key K' by extending the shared secret seed key K, is an example of what is commonly referred to as a stream cipher.

Thus, in accordance with one aspect of the present invention, a relatively small shared secret seed key K is used, and the shared secret seed key is extended using an encoder, such as a stream cipher, to produce the larger extended key K'. It is easy for two users to share a relatively small secret key.

In addition to the use of a shared secret seed key K in the present invention for data encryption, authentication and key expansion/generation, fundamentally unavoidable quantum noise of coherent states of light is used.

In accordance with a further aspect of the invention, the quantum cryptography techniques of the present invention employ microscopic to macroscopic signals, i.e., low energy to large-energy coherent states with a chosen average number of photons, rather than a single photon, for encrypting data. For example, each bit of data to be transmitted can be encoded using either on average a few photons or tens to hundreds of thousands of photons. Running keys obtained from the extended keys are used to select quantum signal sets for different bit values. Preferably, the number of coherent states M is much larger than the square root of the average number of photons $|\alpha_0|^2$ used to encode a given bit value. The use of macroscopic signals overcomes loss and allows ordinary amplification, switching and routing. The source of photons, which can be a laser source, can be set to produce a large number of photons, but restricted such that $M>>|\alpha_0|$. For this example, the power of the laser source is preadjusted to provide the desired number of photons in each bit slot.

In particular, with the quantum cryptography techniques in accordance with the invention, the following can be accomplished using ordinary laser outputs:

(i) with privacy amplification, unconditionally secure key-expansion can be obtained using low to intermediate energy signals without intrusion detection, if the attacker does not know the key K, and with intrusion detection in case the attacker does, as in other known quantum cryptographic schemes; and (ii) provable unconditionally secure in some implementations, though not perfectly secure, data encryption for any key size |K| can be achieved at optical speeds with low to large-energy signals for complexity-based security. By way example, the The basic underlying reasons for the possibility of obtaining unconditionally secure key-expansion using low to intermediate-energy signals without intrusion detection while using macroscopically distinguishable signals are the no-clone theorem known in the art, and the fact that a good quantum measurement suffering a small amount of quantum noise can be made with knowledge of the seed key K, while only a poor quantum measurement suffering a large amount of unavoidable quantum noise is possible without knowing the seed key K. Since secure secret keys are still required to-date in quantum cryptography for authentication purposes, thus achieving only "key expansion" as described above, the possibility (i) above represents a new and efficient method for secure key expansion.

These schemes work in wave division multiplexing (WDM) networks and free space optics networks that are in use today. In addition, in the network implementations of these cryptographic schemes and methods, the encrypted signals can go through amplifiers, splitters, arrayed waveguide grating (AWG) devices, dispersion compensating modules (DCMs) and other network elements. The schemes can be used in all types of networks, including enterprise, metro, short haul, and long haul. Moreover, the schemes are independent of underlying software protocols currently in use for managing the data networks.

There are two basic problems with classical encryption that does not employ the inefficient one-time pads. One is that the total data uncertainty H(X) given observation Y is bounded above by the key uncertainty, $H(X) \leq H(K)$. The other is that the key K may be found by a known plaintext attack when the eavesdropper (Eve) knows the output-input pairs (Y, X) for some data length. In our scheme, H(X) is not bounded by H(K) because Eve cannot have the observation Y that Bob obtained via the optimal quantum measurement utilizing the key K. To extract information from even a full copy of the quantum signal without knowing K, Eve has to make a suboptimal measurement that would yield information on all possible signal sets for the purpose of either estimating X or finding K from a known-plaintext attack. As a result, Bob has a better channel/observation than Eve. Also, in contrast to classical cryptography, one can prove the security of the crypto system provided by the invention against ciphertext-only attacks, although only such individual attacks are described herein. However, it can be shown that, in a properly designed system, even an exponentially powerful search with known plaintext attacks cannot succeed because Eve does not have the same Y as Bob. Practically, the protocol can run at high speeds because there is no need for a long key K.

All key expansion schemes have to involve the following feature: the attacker (or eavesdropper) Eve's observation $Y_E$ and the receiver-end user Bob's observation $Y_B$ have to be different, as a consequence of fundamental information-theoretic consideration that can be traced back to C. E. Shannon, "Communication Theory Of Secrecy Systems", Bell System Technical Journal, vol. 18 pp. 656-715, 1949. Let H(·|·) be the conditional entropy function, K the shared secret seed key for data decryption, and X the relevant data agreed to be used by the two users Alice and Bob. It can be shown that key expansion is possible if, and only if:

$$H(X|K, Y_E) > H(X|K, Y_B) \qquad (1)$$

In particular, it follows from equation (1) that key expansion is impossible if either $H(X|K, Y_E)=0$ or if $Y_E=Y_B$). In both noise cryptography and quantum cryptography discussed above, the condition defined by equation (1) is achieved without K, a result enforced in the quantum case with intrusion detection via quantum effects. In the presence of K, equation (1) represents that given Eve's observation $Y_E$, the data (X) uncertainty is greater for Eve than for Bob when Eve tries to pin down X with different K's. Equation (1) can be satisfied whenever the Shannon limit $H(X|K, Y_E) \leq H(K)$ is broken, via noise or quantum effects. This concept of key expansion from a shared secret key underlies the following protocols for key expansion. To demonstrate how it may greatly improve the efficiency and security of a key distribution system, the quantum qubit (two-dimensional quantum state space) case is first considered. The resulting scheme is already much more efficient than that disclosed by Bennett and Brassard (BB84), and can be shown to be unconditionally secure even for very lossy/noisy channel with simple extensions.

Figure 3:
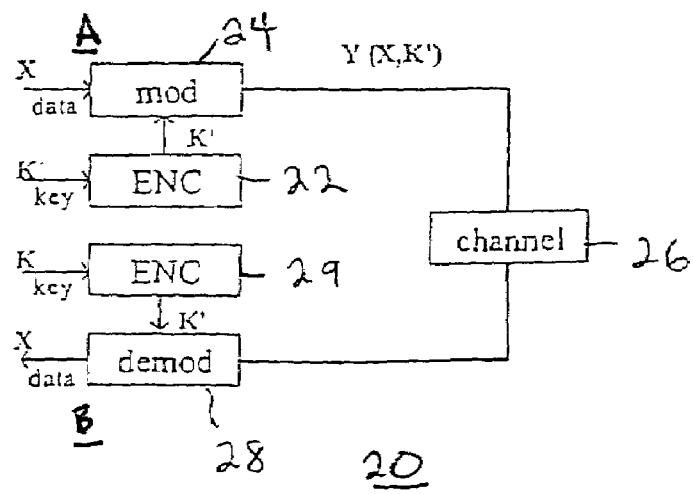
FIG. 3 is a block diagram illustrating the creation of shared secret extended keys for modulating the data.

FIG. 3 is a simplified representation of a system 20 for encryption of data X with the shared secret seed key K in accordance with the invention. At location A, the location of the sender Alice, the secret seed key K is applied to a standard encryption mechanism 22 to generate a random extended key K' which is applied to a modulator 24 for encrypting the data X. The encrypted data is transmitted via an optical communication channel 26 to a receiver Bob at location B.

Figure 2:
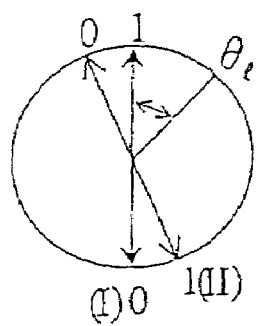
FIG. 2 is a diagram illustrating the choice of bases for a two-mode coherent state implementation.

At location B, the shared secret seed key K is applied to a standard encryption mechanism 29 to generate the same random extended key K' for a demodulator 28 for decrypting the encrypted data X. This particular type of KCQ scheme will be referred to as αη (for coherent states and efficiency). Thus, in the encryption scheme for this new protocol, Alice uses an explicit short secret seed key K, extended to a longer key K' by another encryption mechanism, such as a stream cipher, to modulate the parameters of a multi-mode coherent state. For free-space implementations, the qumodes may be the two orthogonal modes of polarization. In this case, Alice uses the extended key K' to specify a polarization basis from a set of M uniformly spaced two-mode bases spanning a great circle on the Poincaré sphere, as shown in FIG. 2. Each basis consists of a polarization state and its antipodal state at an angle n from it, representing the 0 and 1 bit values for that basis.

The message X is encoded as Y(X,K'). This mapping of the stream of bits onto points on the surface of the Poincaré sphere is the information to be shared by Alice (A) and Bob (B). Because of his knowledge of K', Bob is able to make a precise demodulation operation, producing the plaintext X. He uses K' to apply the requisite polarization transformation to the received sequence of polarization states to return them to the linearly orthogonally polarized condition, representing the two original bits of the message X. Bob's demodulation is the inverse mapping transformation that was utilized by Alice.

Referring to FIG. 2, let an arbitrary qubit state be represented by a real vector in the Bloch-Poincaré sphere. As depicted in FIG. 2, 2M points uniformly distributed on a fixed great circle on the sphere are used for M possible bases. The opposite points on a diameter correspond to two orthogonal states of a basis, representing the 0 and 1 bit values for that basis. The two neighbors of each point on the circle are taken to represent a different bit value. A secret key is used to select a specific basis for each qubit between users Alice and Bob, as well as a polarity bit that is added to the data bit for randomizing the polarity of the basis.

As stated above, in one example, the length of the shared secret seed key K can be s=16 bits. The extension results in a long extended key K', having a number of bits equal to $2^{16}$. The long extended key K' for such selection is obtained as the output from the encryption mechanism 22 operating on the shorter seed key K to produce the synchronous stream cipher. As an example, a linear feedback shift register (LFSR) can be used to produce the long extended key K'.

For an implementation employing qubits rather than coherent states, a total of $1+\log_2(M)$ bits from the long extended key K' can be used to determine the polarity bit and the selection of M possible bases. Without knowing the secret key and granting Eve a perfect copy of the qubit, Eve's probability $P_c^E$ of correctly identifying the bit value can be obtained from the optimum binary quantum detector given in quantum detection theory disclosed in reference *Quantum Detection and Estimation Theory*, C. H. Helstrom, Academic Press, Ch. IV 1976 and in "Unconditionally Secure Quantum Bit Commitment Is Possible", H. P. Yuen, LAN quant-ph/0006109 and in "Unconditionally Secure Quantum Bit Commitment Is Possible", H. P. Yuen, LAN quant-ph/0006109. In this case, $P_c^E$ can be formed exactly and is simply bounded by $P_c^E < \frac{1}{2}(1+1/M)$ if the polarity is known, with $P_c^E = \frac{1}{2}$ if the polarity is not known. Eve's probability of exactly identifying which one of the 2M states the qubit is in also can be obtained exactly as $P_c^{\sim E} = 1/M$ from the optimum M-ary quantum detector such as that disclosed in "Optimum Testing Of Multiple Hypotheses in Quantum Detection Theory", H. P. Yeun, R. S. Kennedy and M. Lax, *IEEE Transactions on Information Theory*, vol. 21, pp. 135-134, 1975. This $P_c^{\sim E}$ is exactly the uniform probability that Eve would pick one of the M bases correctly. Note that the direct use of detection probability is more appropriate in this situation than the use of mutual information, which has only asymptotic significance in noisy systems.

A novel cryptographic feature here is that the observation $Y_E$ that really gives any information on the bit depends on the key K. This corresponds to one basic scenario under which equation (1) can be satisfied. In the present situation, the feature is obtained because the proper quantum measurement basis yielding $Y_E$ is determined by K. The well-known no-clone theorem implies that even if Eve has a perfect copy of the qubit, Eve cannot obtain a list of all the possible data values corresponding to different keys K for that qubit. Eve has only one copy of the given qubit on which to make a measurement to extract information, and no approximate cloning could produce a better result than a proper measurement on the copy.

Thus, the uncertainty H(X|K,Y) associated with different keys K all pertain to a fixed given observation Y, and thus are not the optimal ones associated with different observations Y for the different keys K. When the data is random and unknown to Eve, as is the case in key expansion where Alice would randomly generate the data X in setting up a new key, it can be shown from the above-mentioned results and quantum detection theory, that unconditionally secure key expansion can be obtained from the above scheme. Basically, the joint randomness of $Y_E$ and X prevent any possible exploitation of correlations in K'. Specifically, if Eve does not know the key K, Eve could obtain no information at all on any n-qubit output sequences generated this way, except for an exponentially small probability $2^{-|K|}$ for key length |K|. If Eve knows the key K, privacy amplification and intrusion detection are required. Privacy amplification and intrusion detection are known in the art. A testing or final encryption on the correctness of the new shared data X is always needed. It is apparent that loss and noise do not make Eve's situation any better, and the scheme works with simple classical error correcting codes and privacy amplification on the qubit sequence in the presence of such channel disturbance. The qubit scheme described above has only one photon per mode and uses linearly dependent states that cannot be amplified without serious degradation.

In a further embodiment, coherent states of arbitrary energy, large to small, are used in a similar scheme. Each data bit is encoded into a coherent state of an infinite-dimensional space. Since coherent states of different amplitudes are linearly independent, they span an infinite dimensional space which is referred to herein as a "qumode".

Referring again to FIG. 2, consider M possible coherent states $|\alpha_l\rangle$ in a single-mode realization $$\alpha_l = \alpha_o(\cos\theta_l + i\sin\theta_l), \quad \theta_l = \frac{2\pi l}{M}, \quad l = 1, \ldots, M \quad (2)$$

where $\alpha_o^2$ is the energy in the state and the angle between two neighboring states is $2\pi/M$, similar to the qubit states on a great circle.

A seed key K is used to drive an encryption mechanism the output of which is a much longer extended key K' that is used to determine, for each qumode carrying bit b(=0, 1), which pair of signals (signal set) is to be used. Each signal pair of signals can be macroscopically distinguishable since the inner product of any two basis states is $\exp(-2|\alpha_0|^2)$. For large M, a lower bound on the obtained mean-square error $(\delta\emptyset)^2$ that goes as $1/|\alpha_0|^2$ shows that asymptotically when $M>>|\alpha_0|$, the attacker's error probability $P_e^E$ tends to ½, the guessing level, in an individual attack on the data bit b. That this result holds in the limit M→∞ for fixed $|\alpha_0|$ is intuitively obvious. A two-mode coherent-state realization similar to equation (2), with $|\alpha_0\cos\emptyset_1>|\alpha_0\sin\emptyset_1\emptyset$, can also be used and the modes can be interpreted as ones of polarization, time, frequency, or whatever.

The signal set can be based on any number of modes of the electromagnetic waves (or any other energy carrying waves), including radio waves, microwaves, millimeter waves, and light waves, either in free space or in guided media such as optical fiber. One preferred embodiment is with use of two modes of the light waves. The two modes can be polarization modes, time or frequency modes, spatial modes or any combination of such physical attributes of the light waves.

Figure 4:
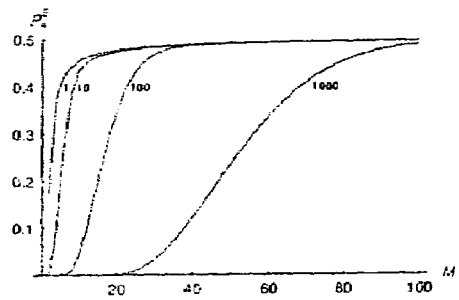
FIG. 4 is a graph illustrating an attacker's error probability $P_e^E$ for attacks on the encrypted messages as a function of bases M for different numbers of photons per bit.

Numerical calculation of the optimal positive operator valued measure (POVM) for individual attack on bit discrimination for the M-ry case has shown that the minimum probability of error $P_e^E$ for an eavesdropper can be made arbitrarily close to ½ for a given coherent-state amplitude $\alpha_0$. The value $P_e^E \to \frac{1}{2}$ for a fixed average number of photons $|\alpha_0|^2$ is achieved by increasing the number of levels M. As shown in FIG. 4, $P_e^E$ goes very fast to the asymptotic pure-guessing limit of ½ as M increases. The above POVM calculation demonstrates that in an eavesdropper cannot obtain the bits sent regardless of the precision of her devices. The optimal POVM gives the maximum amount of information she could obtain from the sequence of physical signals sent without knowing the key. This uncertainty is due to the quantum noise of light and cannot be overcome with one's precision capabilities. Bob, on the other hand, by knowing the key can extract information with greater precision. His decision has to be made only between two nearly orthogonal states in the same basis defined by a given K'. His probability of error is $P^B_e = \frac{1}{2}(1-\sqrt{(1-e^{-2T|\alpha_0|^2})})$, where T is the transmissivity of the channel. For large values of $|\alpha_0|$ the minimum probability of error $P^B_e$ is negligible, which makes possible an excellent signal recovery by the legitimate receiver. The case of collective attacks is more complicated and cannot be discussed here, in part because there is no meaningful approach for evaluating the optimal bit error, even in the classical case. However, the entropy bound (Holevo's theorem) could be used for the criterion of data entropy.

The attacker can also try to find the key K based on her copy of the quantum signals, with or without some known plaintext (data) corresponding to the signals. Even in a known-plaintext attack, the signal quantum fluctuation would yield, from the number of possibilities in each qumode, an exponential number of possible K' in a sequence of data bits. To identify K from such noisy observations of possible K' would involve an exponential search, which can always be launched against a key in known-plaintext attacks but which is currently believed to be proven impossible computationally even with a quantum computer. Note that the attacker has a much more difficult job of estimating the signal pair from M possible signal pairs than the user who tries to discriminate two possible known states. It is important to note that, in the case of classical cryptography, if the extended key K' is used directly as a one-time pad on the data, the result is well known to be insecure against known-plaintexts attacks. In this case, this attack is thwarted by quantum effects as explained above.

In a two-mode realization, the states are products of two coherent states as represented by equation (3):

$$|\alpha_o \cos\theta_l\rangle_1 |\alpha_o \sin\theta_l\rangle_2, \quad \theta_l = \frac{2\pi l}{M}, \quad l = 1, \ldots, M \quad (3)$$

The qumodes can be those associated with polarization, time, frequency, or any classical modes. Any two basis states, similar to phase reversal keying signals, are nearly orthogonal for $\alpha_o > \sim 3$. The optimal quantum phase detector yields a root-mean-square phase error $\Delta\theta \sim \alpha_o^{-1}$. Thus, when $M \gg \alpha_o$, the probability of error is $P_e \sim \frac{1}{2}$ when the basis is not known, and the probability of error is $P_e \sim e^{-\alpha_o^2}$ when the basis is known.

This scheme can be used for key expansion as follows. An attacker not knowing the key K has to make a measurement to cover all possible angles for different possible K' in an effort to pin down the new data. The optimal heterodyne measurement for this purpose is worse than the optimal quantum measurement by 6 dB in signal energy, a quantum effect with no classical analog. If the total signal energy used is intermediate, not too large as to allow Eve to determine the signal with a very small error probability given the 6 dB energy handicap, privacy amplification can be used to eliminate Eve's information exponentially efficiently. If Eve disrupts the signal during her attack, the system can still be designed so that Eve's information can be eliminated from the corrected data without intrusion detection. With intrusion detection the scheme works even if Eve knows the key at the time the data is intercepted as in other quantum cryptographic schemes. The length of each optical link before amplification has to be chosen to account for Eve's possible energy advantage from tapping near the transmitter. The asymptotic key expansion efficiency is given by the mutual information difference between Eve and Bob with respect to Alice, assuming ideal devices. Only such ideal estimates have been available so far in quantum cryptography.

A one-time pad can be used in conjunction with key expansion to obtain perfectly secure data encryption. However, efficiency could be degraded to perhaps below optical speeds, depending on the system parameters. Since perfect security is not required in most applications and efficiency is paramount for the Internet, the scheme represented by equations (2) and (3) can be used more efficiently for direct data encryption by letting $\alpha_o \gg 1$. In this case, Eve can obtain a good copy similar to Bob's copy and identify $\theta$, to within a certain range $\Delta\theta$. Similar to the qubit case, the stream cipher output K' is not observable as would be the case in a known plaintext attack if K' is used as usual to directly encrypt the input data by mod 2 addition. In the present situation, Eve could obtain a range of possible stream cipher output K', with a smaller range if Eve knows the plaintext, and then try to decrypt X and find K. While the range of such possible K' is exponentially large, it is not the maximum possible $2^{|K|}$ unless the following randomization technique is employed with the input also randomized.

Digressing, unconditional security for data encryption corresponding to a given key size $|K|$ will now be defined for the condition where there are $2^{|K|}$ equi-probable data sequence $X_n$ of any given length $n \geq |K|$ corresponding to an observation sequence $Y_n$. This definition generalizes the notion of perfect security and is more relevant for practically all encryption situations involving a fixed length key.

In a randomized technique according to the invention, the user Alice modulates the transmitted $\alpha_l$ for a given stream cipher output to a uniform distribution on the circle of fixed energy $\alpha_o^2$. For any given data bit value and $1+\log_2(M)$ bits of K' that fix a signal point on the circle, Alice further turns the tip of $\alpha_l$ within a semicircle taking into account the quantum noise spread. If a maximum-length linear feedback shift register is used for the stream cipher in FIG. 3 with key (seed) length $|K|$, it can be shown that in the output K', sub-sequences of length $1 \leq k \leq |K|$ within its period $2^{|K|} - 1$ are uniformly distributed. However, there are correlations in a sequence at positions more than $|K|$ bits apart. All correlations including these are eliminated with the above random modulation if the data X is also random and unknown to Eve. In that situation, the random modulation by Alice and the randomness of each bit yields a uniform distribution on each bit position which is independent from one bit position to another, decorrelating all the positions in the K' sequence at the Y stage. Thus, from the $\theta_l$ observation, Eve can only launch an exhaustive exponential search for all $2^{|K|}$ keys K and possible X combinations. Therefore, it is secure also against a quantum computer, which could speed up searches only quadratically. Indeed, unconditional security for encryption with a given key size in this sense is also obtained as can be proven in some implementations.

The qumode data encryption scheme with randomization and large-energy coherent states is essentially classical, and effectively channel-noise independent as it works the same with $\Delta\theta \sim 0$. Such a qumode data encryption scheme is unaffected by loss and noise in transmission with the use of a proper power budget or error control. Thus, the qumode data encryption scheme runs at optical speeds, matching the raw data rate. The qumode data encryption scheme can be called a spread-signal technique because it can be viewed as a generalization of the spread spectrum technique. However, neither the bandwidth nor the signal power is being increased in this scheme. It is the signal resolution that needs to be increased.

On the other hand, the additional use of optical code division multiplexing (CDMA), hereinafter referred to as OCDM, in the general sense including time division multiplexing (TDMA) and waveform division multiplexing (WDMA), would confer a great deal of additional practical security for both key expansion and data encryption, which by itself may already be sufficient for Internet applications as follows. Instead of sending a single coherent state qumode, Alice sends m modes, $$|\alpha_{l_i}>_1 \ldots |\alpha_{l_m}>_m, l_i \in \{1, \ldots, M\}, i \in \{1, \ldots, m\} \quad (4)$$

where the distribution of $\alpha_{l_i}$ in equation (4) as well as the specific modes themselves are controlled by a secret key, e.g., of the form given in equation (2) with $m\alpha_o^2$ sufficiently large for a chosen OCDM code. Randomization of data is employed with no random modulation as in the qubit case. Without knowing what the modes in equation (4) are as in the case of spread spectrum, Eve would need to make heterodyne measurements on all the possible modes and store them, e.g., for key trials to pin down the possible extended key. Not only are heterodyne measurements difficult to make in communication situations, the resulting storage requirement is large, 2Nq bits for q-bit quantization of each dimension for N~TW modes with possible duration T and bandwidth W. It is also practically impossible for Eve to have enough local oscillators to make the necessary heterodyne measurements or be able to amplify on all the possible modes to avoid simple power intrusion detection. When such practical limits are in force, a large value for $\alpha_o$ can be used to obtain ultra-fast secure key expansion and corresponding one-time pad encryption. The resulting scheme would still be ultra-secure given the practical limits which are not likely to be circumvented in the future, if at all. Indeed, such a key expansion scheme can be interpreted as the result of a practical-limit induced K-dependent, $Y_E$ satisfying equation (1).

The OCDM scheme and the employment of intrusion detection for key expansion fit in with network control and management issues. In particular, each node in the network optical core can manage the choice of OCDM codes and perform corresponding intrusion detection. Generally, protocols at different network layers would be required for utilizing this technology in a network.

Figure 5:
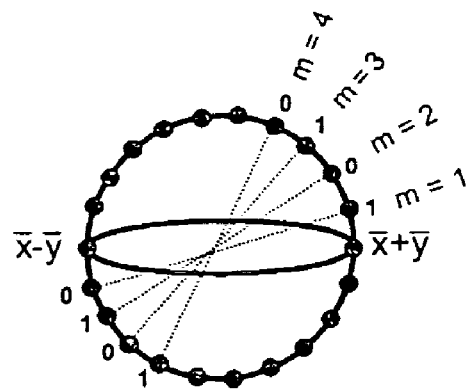
FIG. 5 illustrates a plurality of pairs of orthogonal states uniformly spanning a great circle of the Poincaré sphere in the embodiment where the two modes are the polarization modes of light.

In the two-mode embodiment, the irreducible measurement uncertainty of the two-mode coherent-states is the key element in the security of this scheme. Further, in the two-mode embodiment employing polarization modes, the coherent states employed are $$|\Psi_m^{(a)}\rangle = |\alpha\rangle_x \otimes |\alpha e^{i\theta m}\rangle_y, \quad (5)$$

$$|\Psi_m^{(b)}\rangle = |\alpha\rangle_x \otimes |\alpha e^{i(\theta m + \pi)}\rangle_y, \quad (6)$$

where $\theta_m = \pi m/M$, $m \in \{0, 1, 2', \ldots (M-1)\}$, and M is odd. Viewed on the Poincaré sphere, these 2M polarization states form M bases that uniformly span a great circle as shown in FIG. 5. Using a publicly known s-bit linear feedback shift-register (LSFR) with judiciously chosen feedback terms, the transmitter (Alice) extends an s-bit secret-key, K, to a $(2^s-1)$ bit extended key, K'. The extended key is grouped or segmented into disjoint blocks of r-bit running keys, R, where $r = \log_2(M)$ and s>>r. Depending on the data bit and the extended key K' state in equation (5) or (6) is transmitted, where m is the decimal representation of R. Specifically, if m is even, then $(0, 1) \to (|\Psi_m^{(a)}\rangle, |\Psi_m^{(b)}\rangle)$, and if m is odd, then $(0, 1) \to (|\Psi_m^{(b)}\rangle, |\Psi_m^{(a)}\rangle)$.

The condition s>>r needs to be satisfied for reasons of security. Certain kinds of attacks, such as known-plaintext attacks, by an adversary can be thwarted by fulfilling this condition.

The manner in which the extended key K' is segmented is as follows. The two parties share identical key extending devices which when seeded with the shared secret key generate identical extended keys. Since M is prearranged by both parties, they start to pluck $r = \log_2(M)$ bits of the extended key string in synchronism. The key extending devices can be implemented in software or hardware, such as by implementing the LFSR (linear feedback shift register) or RC4 (Rivest code 4) algorithm. These devices and concepts are well known in the field of standard cryptography and can be found in standard textbooks.

The number M of bases to be used and the seed key K are prearranged between Alice and Bob. Since M is prearranged, the length (number of bits r) of each is known from the relationship $r = \log_2(M)$ bits.

By way of example, it is assumed that the length of the seed key is 1024 bits ($2^{10}$). The seed key can be extended using a classical key extender (standard encryption algorithm, LFSR, etc.). The extended key K' is subdivided into segments r bits in length. Preferably M>>$|\alpha_0|$ and s>>r for security reasons.

The starting time for a transmission is synchronized by Alice and Bob using any prearranged method. For example, Alice can send a short start signal to allow Bob's clock sync and Bob knows when to start the code generators at the receiving location, after allowing for a suitable transmission delay. The code generators at both sites extend the seed key simultaneously.

For example if M=1024 is chosen, the first 10 bits of the extended key K' (r=10) can be used for encrypting the first data bit to be transmitted.

The 10 bits (r) of the running key R determine which one of the M bases to select, i.e., at which angle relative to the vertical in the polarization embodiment.

If, for example, the running key R=1011111001 giving M=761 (that is, M is odd), then the angle 761π/1024 relative to vertical is logic level 1 and the angle 90° clockwise from it is logic level 0. However, if R=1011111000 giving M=760 (that is, M is even), Alice encodes logic level 0 by an angle 760π/1024 from vertical and logic level 1 at angle 90° clockwise from it.

This results in the logical bit mapping of polarization states on the Poincaré sphere to be interleaved 0, 1, 0, 1, . . . , as shown in FIG. 5.

As indicated above, the laser source is set to produce $|\alpha_0|^2 = 10,000$ photons in each bit slot (which in the 250 Mbps demonstration is 4 ns long). For this example, the power of the laser is preadjusted to provide the desired number of photons in a given bit slot.

Furthermore, in the polarization embodiment, using the same s-bit secret-key and the LFSR, the intended receiver (Bob) applies unitary transformations, U, to his received polarization states according to the running key, where $$U = \begin{bmatrix} 1 & 0 \\ 0 & e^{-i\theta_m} \end{bmatrix} \quad (7)$$

Bob then further rotates the states by so that the states under measurement are $$|\Psi_m^{(a)}\rangle = |0\rangle_{r'} \otimes |\eta\alpha\rangle_{v'}, \quad (8)$$

$$|\Psi_m^{(b)}\rangle = |i\eta\alpha\rangle_{r'} \otimes |0\rangle_{v'}, \quad (9)$$

where $\eta$ is the channel transmissivity and $(x^1, y^1)$ is the rotated basis. Equations (8) and (9) make up a two-mode on-off-key signal set, where the logical mapping corresponds to the parity of the running-key, R.

An important feature to note is that Bob does not require high precision in decrypting a transmitted bit. The application of a slightly incorrect unitary transformation gives $$|\Psi_m^{(a)}\rangle = |-i\eta\alpha \sin(\delta\theta/2)\rangle_{r'} \otimes |\eta\alpha \cos(\delta\theta/2)\rangle_{v'}, \quad (10)$$

$$|\Psi_m^{(b)}\rangle = |i\eta\alpha \sin(\pi/2+\delta\theta/2)\rangle_{r'} \otimes |-\eta\alpha \cos(\pi/2+\delta\theta/2)\rangle_{v'}, \quad (11)$$

While a non-zero $\delta\theta$ results in a larger probability of error for the bit, it does not categorically render Bob's measurement useless for bit decryption. For small $\delta\theta$, the majority of the two-mode signal energy is in one of the two modes. The same applies to Bob's detector noise; while an ideal receiver allows for optimized detection of the two-mode signal, a noisy detector does not limit Bob's decryption ability beyond an increased probability of bit error.

Without knowledge of the secret key and lacking the plaintext, an eavesdropper (Eve) is unable to decrypt Alice's transmission, even when granted ideal detection equipment and all of the transmitted energy. Ciphertext-only attacks on the message and on the running key are thwarted by the irreducible measurement uncertainty of two-mode coherent states. An attack on the message requires Eve to distinguish neighboring polarization states due to the interleaving of the logical bit mappings (FIG. 5). A calculation of Eve's optimal quantum measurement shows that her bit error $P_e$ asymptotically approaches ½ as $|\alpha|$ is decreased (for a given M)). FIG. 7 shows Eve's bit error as a function of signal power for M=2047. In the inset, $\rho_1$ and $\rho_0$ represent density operators corresponding to logical one and zero, respectively. This inability to distinguish neighboring polarization states also limits attacks on the extended key K' by forcing the search space of possible LFSR states to be exponential in s. An important point to note is that this scheme requires no intrusion detection, which is essential to Bennett-Brassard scheme (BB84). On the contrary, our scheme grants Eve all of the signal energy so long as she retransmits a reasonably good estimate of the original state for the purposes of maintaining the channel integrity for the users.

Figure 6:
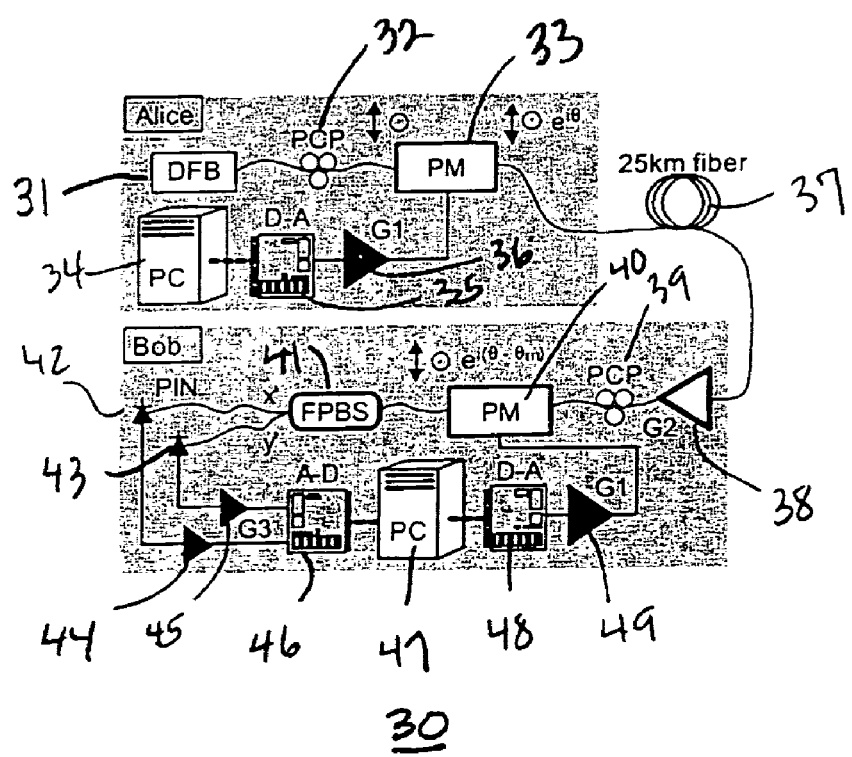
FIG. 6 is a schematic of an embodiment of an encryption/decryption system provided by the invention.

Referring to FIG. 6, one implementation of the described two-polarization-modes encryption/decryption scheme uses commercially available off-the-shelf components. FIG. 6 is a schematic of a fiber-based cryptography system 30 in accordance with the present invention. At the sending location, the cryptography system includes a photon source 31, preferably a laser source, a polarization control paddle (PCP) 32, and a phase modulator (PM) 33. The laser source 31 can be a 1550 nm-wavelength distributed-feedback laser. The running code (or key R) is produced by a linear shift feedback register (LFSR) which in one embodiment, is implemented in software on a personal computer (PC) 34. The phase modulator 33 is controlled by the running code produced by personal computer 34, the digital signal output of which is converted to an analog signal by a digital-to-analog converter 35, the output of which is coupled to the phase modulator 33 through an amplifier (G1) 36. The digital-to-analog converter 35 can be the Chase Scientific, model AWG2000) which is a 12-bit digital-to-analog-digital converter. The phase modulator 33 can be a 10 GHz-bandwidth fiber-coupled LiNbO$_3$ phase modulator. The optical communication channel is represented by 25 km of optical fiber 37. At the receiving location, the cryptographic system includes an RF power amplifier (G2) 38, a polarization control paddle (PCP) 39, a phase modulator (PM) 40, a fiber-coupled polarization beam splitter (FBPS) 41 and a pair of photodetectors 42, 43. The photodetectors can be 1 GHz-bandwidth InGaAs PIN photodiodes operating at room temperature. The phase modulator 40 can be a LiNbO$_3$ phase modulator. The outputs of the photodiodes 42, 43 are passed through amplifiers (G3,G4) 44, 45 and an analog to digital converter circuit (A/D) 46 to a personal computer (PC) 47 which controls the phase modulator 40. Each of the amplifiers 44, 45 can be a 40 dB-gain amplifier (such as the Miteq, model AM-1551). The analog-to-digital (A-D) 46 circuit can be the GaGe, model 82G. The digital signal output of the personal computer 47 is converted to an analog signal by a digital-to-analog converter 48, the output of which is coupled to the phase modulator 40 through an amplifier (G1) 49.

With continued reference to FIG. 6, polarization-control-paddle (PCP) is adjusted to project −35 dBm ($2|\alpha|^2$=5000 photons per bit) of power from the laser 31 equally into the two polarization modes of Alice's phase modulator. Driven by the amplified output of analog to digital circuit, the phase modulator introduces a relative phase (0 to $2\pi$ radians) between the two polarization modes. The LFSR, which is implemented in software on a personal computer (PC) 34, yields a running key, that when combined with the data bit, instructs the generation of one of the two states described in equations (5) or (6). For each data bit, the resultant information bearing light signal is defined by a number of photons in the range of about 1,000 to about 100,000 photons, for example.

On passing through the 25 km of SMF-28 fiber 37, which introduces 5 dB of loss, the light is amplified by amplifier 38 with a gain G of about 30 dB and a noise figure very close to the quantum limit (NF of about 3 dB). Before passing through Bob's phase modulator, the received light is sent through a second PCP 39 to cancel the polarization rotation caused by the 25 km of fiber 37. While these rotations fluctuate with a bandwidth on the order of kilohertz, the magnitude of the fluctuations drops quickly with frequency, allowing the use of a manual PCP 39 to cancel the unwanted polarization rotations. Bob's measurements could be used to drive an automated feedback control on the PCP 39.

The relative phase shift introduced by Bob's phase modulator 40 is determined by the running key R derived from the extended key K' generated through a software LFSR in Bob's PC 46 and applied via the amplified output of D-A circuit 47. After this phase shift has been applied, the relative phase between the two polarization modes is 0 or $\pi$, corresponding to a 0 or 1 according to the running key: if R is even then (0, $\pi$)→(0,1) and if R is odd then (0, $\pi$)→(1,0). With use of a fiber-coupled polarization beam splitter oriented at $\pi/4$ radians with respect to the modulator's principal axes, the state under measurement [equation (8) or (9), or more generally, equations (10) or (11)] is direct-detected by the two photodiodes operating at room temperature, one for each of the two polarization modes. The resulting photocurrents are amplified by amplifiers 44, 45, sampled by analog-to-digital converter circuit 46, and stored for analysis.

FIGS. 8 and 9 show results from 5000 A-D measurements (one of the two polarization modes) of a, 9.1 Mb bitmap file transmitted from Alice to Bob (FIG. 8) and to Eve (FIG. 9). The data rate is 250 Mbps and the insets show the respective decoded images. The transmitted images include an image of the American flag. Note that Bob can decrypt properly as illustrated by FIG. 8 whereas the measurements (results) obtained by an evesdropper, such as Eve, lack definition as shown by the grey block. The apparent banding of Eve's measurements is due to the sinusoidal intensity transfer function of polarization modulation. In this experiment, actions of Eve can be physically simulated by Bob starting with an incorrect secret key. Clearly, a real eavesdropper would aim to make better measurements by placing herself close to Alice and implementing the optimal quantum measurement. While FIG. 8 does not explicitly demonstrate Eve's inability to distinguish neighboring polarization states, it does, however, show that a simple bit decision is impossible. In the current setup, the 12-bit D-A conversion allows Alice to generate and transmit 4094 distinct polarization states (2047 bases). The numerical calculation used to plot FIG. 7 then shows that for $2|\alpha|^2=5000$ and M=2047, Eve's minimum probability of error follows $|P_e-1/2|<10^{-16}$.

The following physical realizations of the quantum cryptographic schemes provided by the present invention, use the usual optical states that are emitted by ordinary lasers and that can be readily amplified and switched in a network. The free-space scheme involves the use of two polarization modes, which, in principal, can also be implemented in fiber systems based upon temporal modes. Moreover, the techniques of the present invention also can be used in schemes using two or more time modes, or two or more frequency modes that are analogous in performance to the polarization scheme for the free-space system.

Free-Space Scheme

Figure 10:
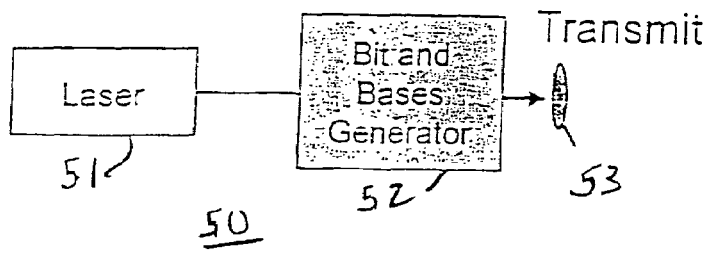
FIG. 10 is a block diagram of a free-space embodiment of the cryptography system provided by the invention.
Figure 10:
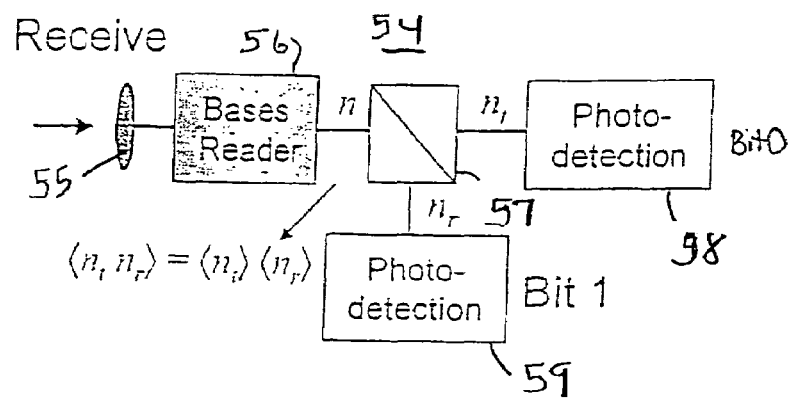

Referring to FIG. 10, there is shown a block diagram of one free-space realization using two polarization modes for the quantum cryptography scheme of the present invention. At the sender's location 50, light beams produced by a laser 51 are modulated by the output of a bit and bases generator 52 for encrypting data with appropriate polarization states. The modulated light beam can be passed through a lens 53.

At the receiver's location 54, the modulated light signal is passed through a further lens 55 and applied to a bases reader 56 which decrypts the polarization states, producing a photon signal n having two polarization states. The bases reader 56 can be identical to the bit and bases generator at the sender location 50.

A light beam separator 57 produces two components $n_l$ and $n_r$ of the photon signal n, representing the bit zero and the bit one states, respectively, of the transmitted data. Separate photo detectors, such as photon counters 58 and 59, are used to detect the photons representing the bit zero and the bit one states, respectively.

In one embodiment, the bit and bases generator 52 is an electro-optic modulator (EOM) driven by the output of a stream cipher implemented by a computer and a digital to analog circuit. In the example, the stream cipher K' is produced by extending the shared secret key K. The EOM rotates the state of polarization (or the bases) according to equation (12):

$$|\Psi_j\rangle = U_M(\Delta)|\Psi_j(0)\rangle \text{ with } \Delta = \frac{\pi}{2}\frac{V}{V_\pi} + \phi_0 \quad (12)$$

where V is the applied voltage and $U_M$ is the unitary phase-shift transformation carried out by the EOM. For a random choice of V (known only to Alice and Bob through the extended key K'), for example, $$|\psi_0\rangle = \frac{1}{\sqrt{2}}\begin{pmatrix} -e^{-i\Delta/2} \\ e^{i\Delta/2} \end{pmatrix} \text{ and } |\psi_1\rangle = \frac{1}{\sqrt{2}}\begin{pmatrix} e^{-i\Delta/2} \\ e^{i\Delta/2} \end{pmatrix} \quad (13)$$

The two orthogonal polarization states, representing bit zero and bit one, respectively, that are coupled into the free-space channel.

At the receiver 54, Bob uses the bases reader 56, which is another stream-cipher-driven EOM that can be identical to the bit and bases generator 52, to decrypt the polarization state. Sweeping the applied voltage V from 0 to $V_\pi$ allows Alice and Bob to access all M basis settings. Assuming a lossless channel in the system of FIG. 10, choosing M=2000 (a resolution of 0.09° in the rotation of polarization), $\alpha_0^2 \sim 10^5$ photons/bit leads to a secure data rate of 100 Mb/s with use of 1 μW of laser power. In one embodiment, avalanche photodiodes are used for photodetection for this set of parameter values. In the presence of loss in the channel, resulting in a decrease in the corresponding received photon number per bit, pre-amplified direct detection receivers can be used in place of avalanche photodiodes as is known.

The use of pre-amplified direct detection receivers is preferable even in the absence of loss, and particularly at higher data rates, because photodiodes, such as InGaAs avalanche photodiodes, are characterized by excessive dark current noise, and substantial excess noise due to avalanche instabilities at high data rates (>100 Mb/s).

Figure 11:
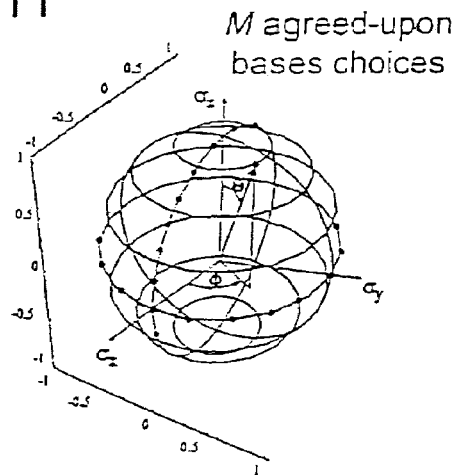
FIG. 11 illustrates the distribution of basis choices on a Bloch-Poincaré sphere.

Explicit secret keys are used to set the polarization bases between Alice and Bob according to equation (3). An explicit key is a short key K appropriately extended into a larger key K' by use of another encryption mechanism such as a stream cipher. In this case, the qumodes are the two orthogonal polarization modes of coherent-state light. Alice uses the secret key to randomly choose a polarization basis from a set of M possible bases uniformly spanning a great circle on the Poincaré sphere, shown in FIG. 11. Alice uses this basis to send a coherent-state bit, containing an average of $|\alpha_0|^2$ photons, to Bob, who can determine the bit value with little error because of Bob's knowledge of the shared key to set the basis in his detection apparatus. Eve, on the other hand, would have to guess the bases and, as shown above, Eve would make errors with near certainty if Alice and Bob choose M>>$\alpha_0$, and agree to represent neighboring polarization states alternately with zeros and ones.

Figure 12:
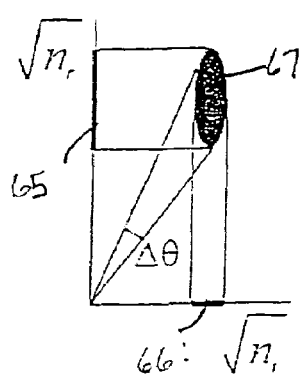
FIG. 12 is a graph illustrating error in polarization angle measurements if the basis choice is not known, for the system of FIG. 10.

FIG. 12 depicts error in the angle measurement for the components $n_t$ and $n_r$ of the photon signal if the basis choice is not known. In FIG. 12, the square root of $n_t$ is abscissa and the square root of $n_r$ is on the ordinate. Variation in $n_t$ is represented by line 65 and variation in $n_r$ is represented by line 66. These variations define an area of uncertainty, represented by the generally elliptical area 67 bounded by angle $\Delta\theta$. Eve's uncertainty in $\theta$ arises from independent measurements.

As an illustration of how the quantum noise of light can be utilized by the legitimate receiver on his behalf, in FIG. 13 we show the uncertainty in the polarization angle produced by a two-mode measurement for an average total photon number <n>~38. Regions of low-variance values are seen around 0 and $\pi/2$ settings of the input polarization state as shown in FIG. 13. Such determination of the polarization angle with angle-dependent uncertainty shows that a higher degree of precision in angle determination can be achieved by an observer with prior information on how to set the measuring apparatus than another who does not have this knowledge. From FIG. 12, one can observe that for PBS-axis orientations close to the incoming field polarization direction, the uncertainty in determination of the angle is small. The polarization angle is obtained by averaging $\arctan\sqrt{(n_r/n_t)}$ over the occurrence of $n_r$ and $n_t$, the photon numbers reaching the detectors as shown in FIG. 10. The approximation that Ø can be obtained through $\arctan\sqrt{(n_r/n_t)}$ is adequate for mesoscopic signals but becomes inadequate as $<n> \to 0$ (quantum phase domain). Setting PBS without knowledge of this preferred orientation leads, on average, to a larger error in determination of the polarization angle. On the other hand, an observer setting his analyzer system close to the field polarization direction (0 or $\pi/2$) is limited only by the optical precision of the analyzer used (which can be made arbitrarily small) and the noise in the detectors.

The cryptography system is designed so that the uncertainties caused by the quantum noise of light in the measurement of the polarization angles is large. It can be shown that the number of bases $N_\sigma$ within a standard deviation of the measured angle is $N_\sigma = M/(\pi|\alpha|)$.

The effect of noise on signal recovery by an eavesdropper in an opaque attack can be simulated by sending repeatedly the same bit, but varying K', from A to B when B (playing Eve) does not apply the key to demodulate the signals. In the following sequence S, the first number in a brace is the basis set by Alice (selected from M=200 possible positions with $N_\sigma$ approximately equal to 6 and correctly recovered by Bob with the use of the key), while the second number is the basis extracted by Eve through a single measurement of $n_t$ and $n_r$. S={1110, 177}, {84, 78}, {108, 99}, {90, 91}, {100, 107}, {102, 97}, {84, 84}, {110, 105}, {110, 111}, {114, 105}, {82, 86}, {100, 95}, {92, 72}, {108, 108}, {102, 90}, {108, 97}, {96, 93}, {110, 103}, {112, 121}, {86, 86}, {102, 100}, {88, 91}, {102, 94}, {106, 98}, {118, 135}. Clearly, Eve makes a large number of errors in determining the transmitted bases.

FIG. 14 is a schematic of a free-space cryptography system using two polarization modes in accordance with the present invention. At the sending location, the system includes a photon source 70, such as a laser, a neutral density filter (NDF) 71, a polarizer (P) 72, a lens (L) 73 and a modulating system (EOM) 74. At the receiving location, the system includes a lens (L) 77, a modulating system (EOM) 78, a polarization beam splitters (PBS) 79, 80, 82; and a pair of single photon counting modules (SPCM) 81, 83, each preceded by a lens (L). Two optional telescopes 84, 85 are shown for field work.

In the free-space cryptography system shown in FIG. 14, the modulation systems utilized both at the transmitter and receiver ends are electro-optic modulators (EOM's) 74, 78, such as the New Focus, model 4104. The photon source 70 is a laser, such as the Toshiba, model TOLD9225M, which operates at 670 nm. The detectors 81, 83 are single photon counting modules, such as the Perkin-Elmer, model SPCM-AQR-16 with interference filters of 10 nm bandwidth in front. A polarization beam splitter (PBS) 79, is used at the receiver to discriminate between the orthogonal linear polarization states. The lenses (L) are used to optimize the beam Rayleigh range within the EOMs. A personal computer containing an interface card, such as a National Instruments, model PCI-6111E, can be used to control the digital-to-analog operation of the EOM's 74, 78. The same card also can be used for counting the output pulses from the detectors 81, 83. In this configuration, a horizontally (H) or vertically (V) polarized light pulse representing bit 0 or 1 is generated and transformed into an elliptically polarized light state by application of the voltage $V_k (k \in K')$. This voltage introduces a phase difference $\Delta\emptyset_k$ between the physical axes of the EOM 74, 78, where $\Delta\emptyset_k = (\pi/2)(V_k/V_\pi) + \emptyset_0$, and $V_\pi$ and $\emptyset_0$ are specific to each modulator. This system operates, with bulk optics, at a 200 kHz rate for demonstration purposes, and faster fiber-based systems (~1 GHz) are being implemented for free-space as well as fiber channels.

FIG. 15 shows a sequence of bits as received by Bob for the system of FIG. 14. The clear separation of the 0 and 1 histograms allow him to make bit decisions with no error. FIG. 15 illustrates the difference of V and H counts (V−H) from Bob's receiver operating at 200 kHz, with the average number of received photons $<n>=|\alpha|^2=27$ and M=50. The corresponding histogram shown as the right portion of FIG. 15 indicates clear separation between the 0 and 1 bit values. The same sequence of bits as seen by Eve are shown in FIG. 16, giving Eve a very high probability of error ($P^E_e \sim \frac{1}{2}$) in bit decisions because of her lacking the key. FIG. 16 illustrates the V−H counts from Eve's receiver in an opaque attack in which Eve takes all the power from the channel that would have gone to Bob. All operating parameters are the same as for FIG. 15 except for Eve lacking the extended key K'. The corresponding histogram on the right shows that distinct bits are not distinguishable by Eve.

Referring to FIG. 14, at the sending location A, Alice encodes each bit of her sequence X as a pulse of coherent-state light, linearly polarized light of N expected photons integrated intensity and polarization according to the bit value 0 or 1 of the bit being encoded.

The signals correspond to the sequence of horizontal and vertical polarization components, respectively. Pulses produced by a pulsed coherent source 70, such as a laser or a laser diode, are sent through a neutral density filter 71, a polarizer 72 and a lens 73 to an electro-optic modulator 74. The amplitude modulator modulates the light pulse. The modulator can be an electro-optic modulator. Depending on relative orientation between the two polarizations.

The optical signals pass as an unguided light beam 75 to a receiver at the receiving location. A reflector 76 can be used to direct the optical signals toward the receiver. If the light beam passes through a medium such as air, the medium must not significantly perturb the polarization of the beam. However, losses due to other factors, such as attenuation, beam spreading, random background noise or stray light, etc., can be tolerated provided that the signal intensity is large with respect to the noise intensity.

At the receiving location, the signals pass through a lens 77 are directed to an electro-optic modulator 78 which recovers the photons. The modulator can be an electro-optic modulator similar to that of the sender. The resultant beam is directed to a polarized beam splitter 79 to separate polarized beam splitting units which receive the photons representing 0 bits and 1 bits, respectively. The photons representing 0 bits pass through polarizing beam splitter 80 and a lens and are detected by photodetector 81, and the photons representing 1 bits pass through polarizing beam splitter 82 and a lens and are detected by photodetector 83.

One advantage of the coherent-state based scheme in accordance with the present invention, is that the encrypted signal can be optically amplified periodically if the channel is lossy. The transmitter and receiver each can include a telescope 84 and 85, respectively, for long-distance free-space propagation.

Figure 21:
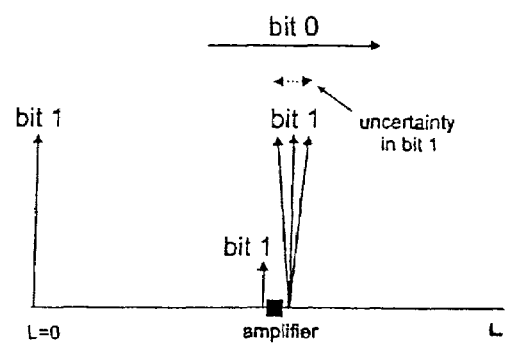
FIG. 21 is a graph illustrating the effects of amplification and loss.

Referring to FIG. 12 and FIG. 21, upon amplification, the angle uncertainty $\Delta\theta$ increases because the amplifier adds independent spontaneous-emission noise into the two modes. The added noise makes Eve's measurements even more uncertain, whereas Bob's observations are affected little because of Bob's knowledge of the basis as discussed above with reference to equation (3) set forth above. It is assumed that the amplifier gain is the same for the two modes (i.e., polarization independent in this case). Practical amplifiers, however, do exhibit small polarization dependencies. Similar considerations also apply in the fiber-optic schemes described below, because the amplifier adds independent noise in the two time modes.

Figure 17:
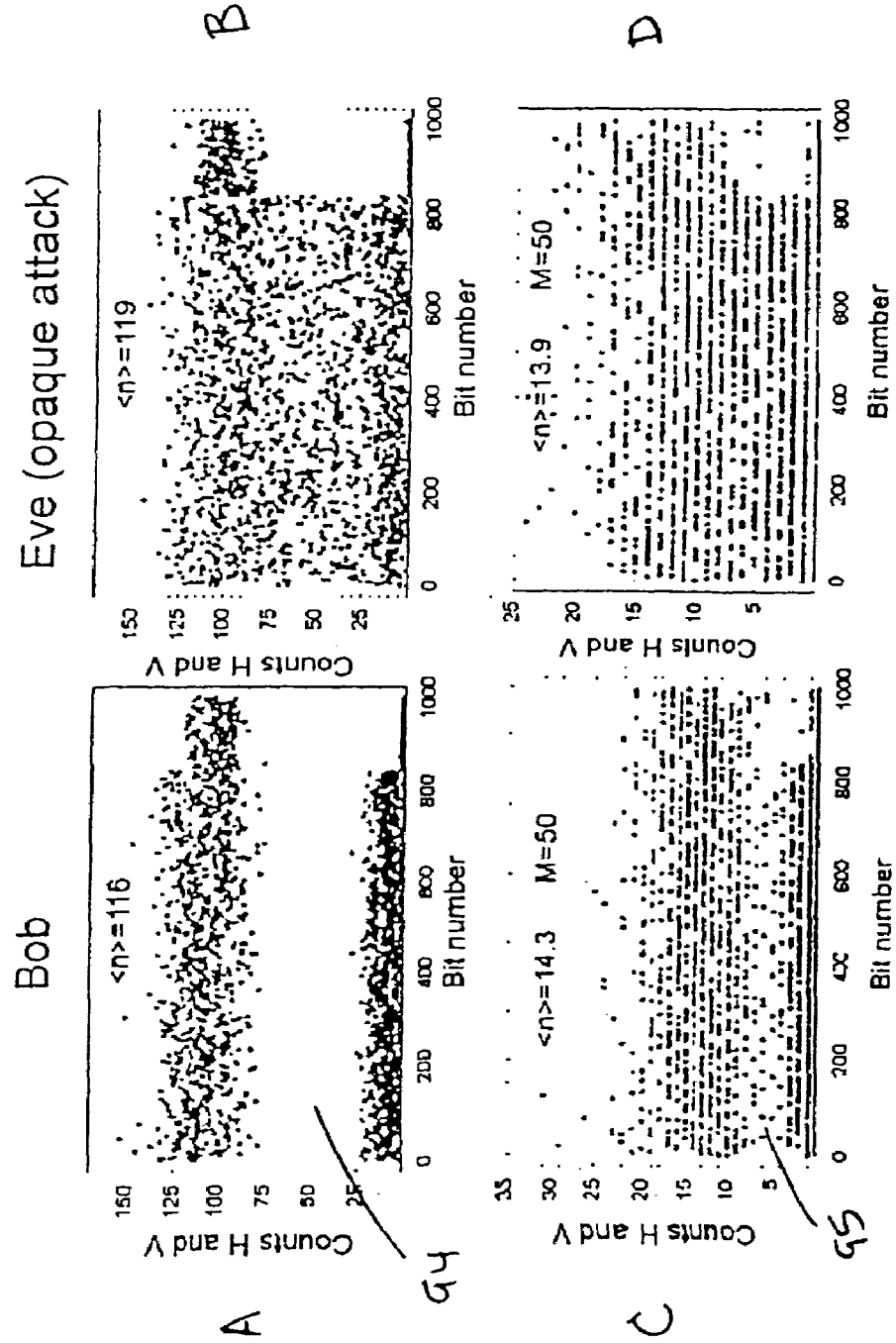
FIGS. 17A-17D are examples of data runs for an authorized receiver and an eavesdropper.

FIGS. 17A-17D are graphs illustrating the results of example data runs. Each of the graphs shows counts, for each rotation, horizontal and vertical, for each bit of a sequence. FIG. 17A shows the counts registered for Bob for the condition that n=116. FIG. 17B shows the counts registered for Eve for the condition that n=119.

FIG. 17C shows the counts registered for Bob for the conditions n=14.3 and the number of bases M=50. FIG. 17D shows the counts registered for Eve for the conditions n=13.9 and the number of bases M=50. By comparing FIG. 17A with FIG. 17B, it can be seen that the distribution for Bob is such that a clear line can be drawn between bit 1 and bit 0 states as indicated by reference numeral 94 in FIG. 17A. In contrast, no such delineation is apparent for the distribution shown for Eve in FIG. 17B. In FIG. 17B, the distribution is such that it is virtually impossible to determine if the line of demarcation between measured points representing bit 1 and bit 0 states.

Similarly, by comparing FIG. 17C with FIG. 17D, it can be seen that the distribution for Bob is such that a clear line can be drawn between bit 1 and bit 0 states as indicated by reference numeral 95 in FIG. 17C. In contrast, no such delineation is apparent for the distribution shown for Eve in FIG. 17D.

Fiber-Optic Scheme

Figure 18:
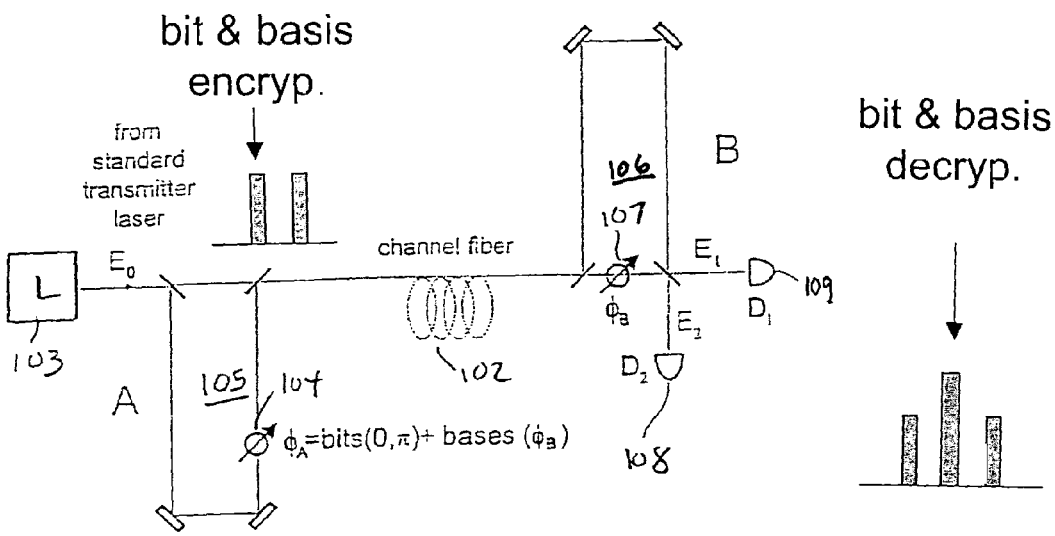
FIG. 18 is a schematic of a fiber-based cryptography system provided by the present invention.

Referring to FIG. 18, there is shown a schematic for a fiber-optic based system wherein a sending station A is connected to a receiving station B by a standard optical fiber channel 102. At the sending location A, the system includes a pulsed coherent source 103, such as a laser or a laser diode, a bits and bases generator 104, such as a high-speed phase modulator and a phase stable Mach-Zender interferometer 105 to introduce a time delay between components of the modulated light beam.

Similarly, at the receiving location B, the system includes a phase stable Mach-Zender interferometer 106 to take out the relative time delay between components of the modulated light beam and a bits and bases generator 107, such as a high-speed phase modulator, for separating the light beam into its two components. The receiving location further includes detectors 108 and 109.

The system is functionally equivalent to the above free-space scheme of FIG. 14, except that it is implemented over a standard fiber channel. Since signal polarization drifts randomly beyond the usual 10 to 100 meter correlation lengths in standard fibers, polarization modes cannot be employed to implement equation (3). However, time modes can be used. If A represents the bit over two time slots, with a small delay between them, then the fiber channel 102 presents the same disturbance to both time slots, which can be common-mode rejected at Bob's receiver at station B.

To implement equation (3), at the sending location A, Alice modulates the phase $\phi_A$ of one of the time slots by the stream cipher output K', and simultaneously encodes the bit in the form of modulo-π phase-shift of one time slot relative to the other. Therefore, the analogs of the bit and bases generators of the system illustrated in FIG. 18 are high-speed phase modulators driven by the stream cipher output K'. Identical phase-stable, Mach-Zehnder interferometers at the sending station A and the receiving location B introduce and take out, respectively, the relative time delay. The detectors 108 and 109 are operated at a speed faster than the bit rate to zoom in on the interfering central peak to achieve the desired SNR. Hence, in addition to bases alignment, which can be provided by identical biasing of the phase modulators at the sending location A and the receiving location, the clock must be recovered with better stability than would be required for usual communication at the given data rate. In one embodiment, nonlinear electrical or optical mixing schemes can be implemented to satisfy this requirement.

OTDM Scheme

Figure 19:
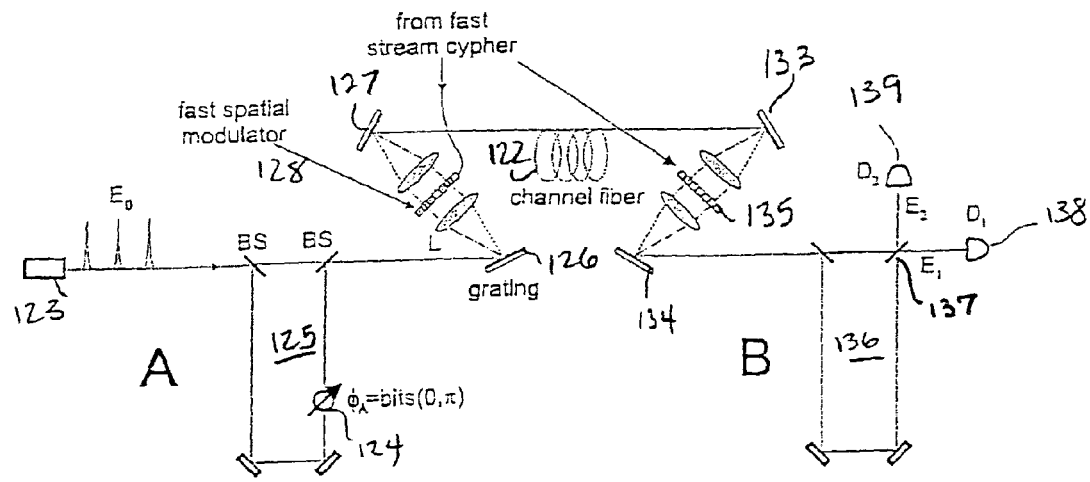
FIG. 19 is a schematic of an optical time division multiplexing cryptography system provided by the present invention.

Referring to FIG. 19, there is shown a schematic for an optical time division multiplexing system wherein the optical spectrum of the two time modes is spread before launching into the optical fiber 122. The system includes gratings coupled with spatial light modulators to introduce relative phase shifts between the frequency components of the optical signal. At the sending location A, the system includes a pulsed coherent source 123, such as a laser or a laser diode, a bits and bases generator 124, such as a high-speed phase modulator and a phase stable Mach-Zender interferometer 125 to introduce a time delay between components of the modulated light beam. The sending station A further includes gratings 126 and 127, and a fast spatial modulator 128. Free-space propagation wherein optical spreading is provided by gratings 126 and 127 coupled with the spatial light modulator 128.

In another embodiment, keys are used to select the bases as in the embodiment shown in FIG. 18, and also to select the spectral modes as in the embodiment shown in FIG. 19. In the combined scheme would be implemented in a manner similar to the scheme illustrated in FIG. 19, but would include an added bases generator and reader in the interferometers, as for the embodiment shown in FIG. 18. In the embodiment shown in FIG. 19, the key is used only to spread the spectrum.

Similarly, at the receiving location B, the system includes gratings 133 and 134 coupled with a fast spatial modulator 135, a phase stable Mach-Zender interferometer 136 to take out the relative time delay between components of the modulated light beam and a beam splitter 137 for separating the light beam into its two components. The receiving location B further includes detectors 138 and 139.

The interferometers 125 and 136 divide the optical signal into two portions with one portion delayed in time with respect to the other portion. If there is an optical phase shift during transmission through the optical fiber, both signal paths will see the same perturbations. Perturbations can be caused by the fiber. The optic fiber exhibits a slow change. One component is subjected to modulation in the receiver the two component are separate and the modulated signal portion is demodulated and the two resultant signals are superposed. If A represents the bit over two time slots, then the fiber channel presents the same disturbance to both time slots and the disturbance can common mode rejected at B's receiver.

To implement encryption or key expansion, the signal can be spread over many modes as described by equation (4) set forth above. Optical CDMA techniques can be employed by Alice and Bob to enhance security. In the system of FIG. 19, the optical spectrum of the two time modes (as in the scheme of FIG. 18 with similar bit encoding) is spread before launching into the fiber channel. The spreading can be achieved in the optical-frequency domain by introducing relative phase shifts between the various frequency components of the optical signal. In FIG. 19, gratings coupled with spatial light modulators, driven by the outputs of stream ciphers, are used for this purpose. Although, such schemes are routinely employed in ultrafast pulse-shaping studies, the spatial light modulators are driven at high rates.

A high-speed stream cipher is needed in the data encryption and key expansion schemes, which has to be faster than the data rate by the factor $m(1+\log_2(M))$ in the m-qumode spread scheme. Many ultrafast stream ciphers of optical or hybrid optical/electronic variety are available. While not proven secure by themselves, they are adequate in so far as security is concerned as discussed above, and also can be multiplexed because they are used for a lower bit rate.

The free space scheme can be implemented at OC-192 rates and the fiber-optic implementation can run at OC-192 speeds. Moreover, the OC-192 implementation can be integrated into a WDM network environment.

Effect of Loss

Figure 20:
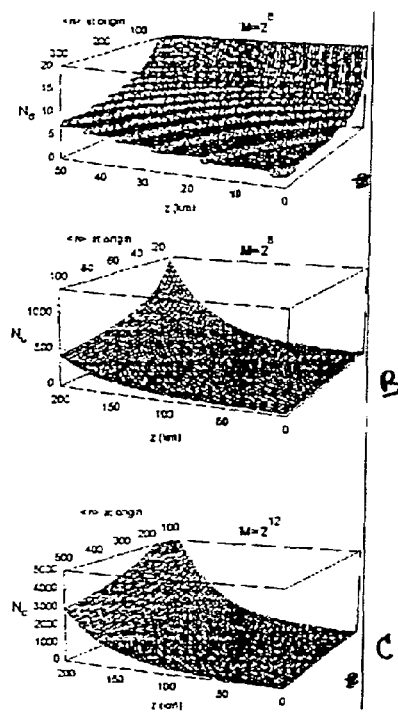
FIG. 20 is a graph illustrating the effect of loss for a number of levels within polarization measurement linewidth as a function of distance.

FIGS. 20A-20C illustrate the number of levels N within the polarization measurement line width as function of z with $\gamma=0.2$ km$^{-1}$. FIG. 20A shows detail of the later with M=256. FIG. 20B shows a larger range of variables for the same value of M=256. FIG. 20C shows a larger number of bases produced using a better digital to analog converter circuit.

Figure 22:
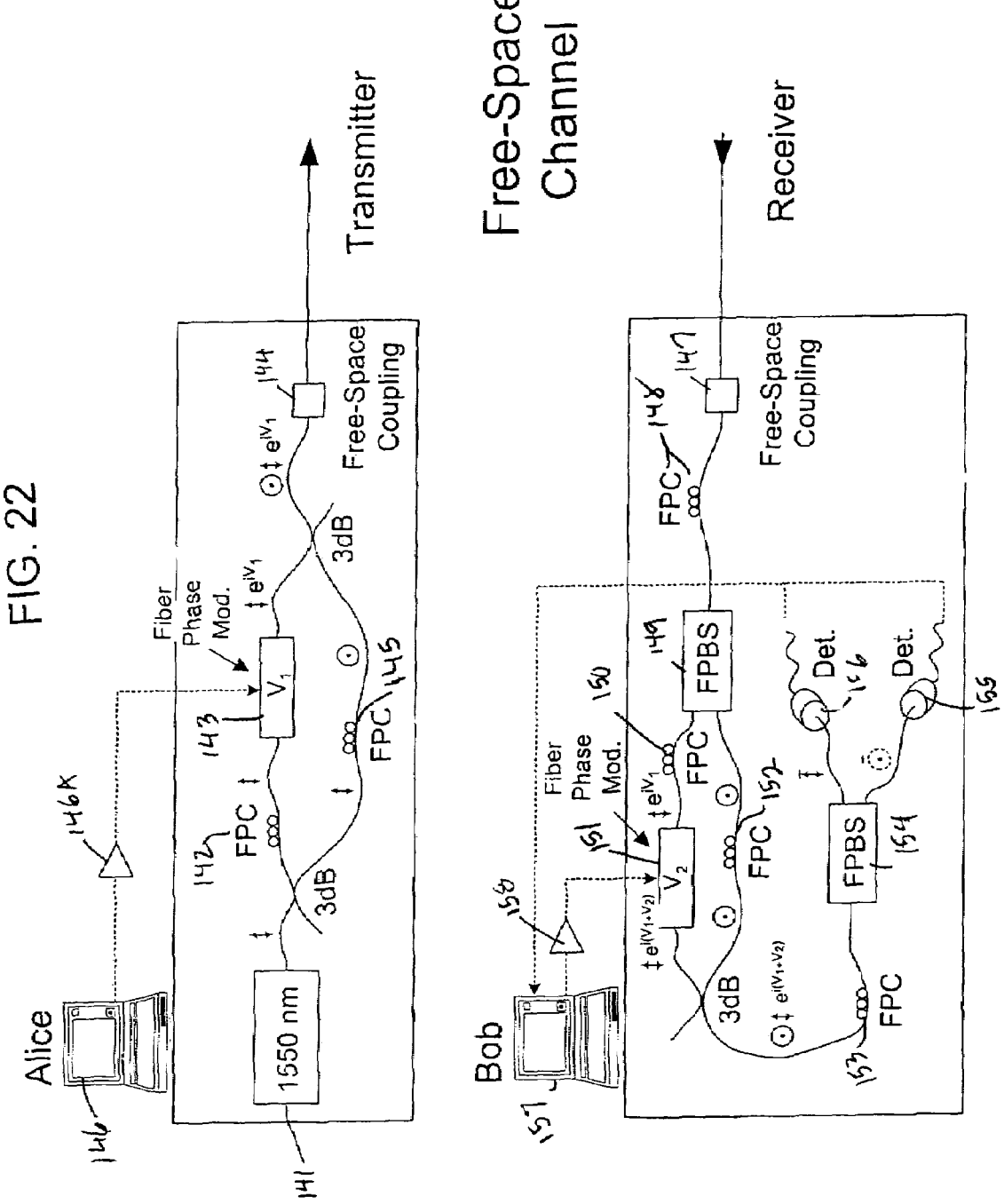
FIG. 22 is a schematic of a Gb/s free-space cryptography system provided by the present invention.

FIG. 22 is a schematic of a high speed, polarization-mode, free-space cryptography system 140 provided by the present invention. By using fiber-pigtailed components, as are standard in fiber-optical telecommunications, the embodiment in FIG. 22 is capable of operation up to 10 Gb/s encrypted data rates. The cryptography system 140 uses commercially available high-speed fiber-pigtailed LiNbO$_3$ phase modulators to achieve modulation and demodulation for bases and bits. At the sending location, the cryptography system includes a photon source 141, preferably a continuous-wave laser source that is coupled to a fiber optical embodiment of a symmetric Mach-Zehnder interferometer 105, similar to that in FIG. 18 but without the extra delay in one arm. This all-fiber embodiment of the interferometer converts fast phase modulations into fast polarization modulations. The interferometer includes a fiber polarization controller (FPC) 142 to equalize the polarization states in the two arms of the interferometer in the absence of phase modulation. It also includes a high-speed phase modulator (PM) 143 to encode the bases and the bits. The output of the interferometer is connected to a commercially available fiber to free-space coupling device 144. The laser source 141 can be a 1550 nm-wavelength distributed-feedback laser. The extended key is produced by a linear feedback shift register (LFSR) which, in one embodiment, is implemented in software on a personal computer (PC) 146. The phase modulator 143 is controlled by the extended key produced by personal computer 146, which can provide digital-to-analog conversion to produce an analog signal that is coupled to the phase modulator 143 through an RF amplifier 146A. The phase modulator 143 can be a 10 GHz-bandwidth fiber-coupled LiNbO$_3$ phase modulator.

At the receiving location, the cryptographic system 140 includes a free-space coupling device 147 corresponding to free-space coupling device 144, a fiber polarizing control (FPC) 148, and a fiber polarizing beam splitter 149 that forms the input to the fiber-pigtailed embodiment of the receiver's symmetric Mach-Zehnder interferometer 107A in FIG. 18, that is, a Mach-Zehnder interferometer without the extra delay in one arm as in FIG. 18. In this all-fiber embodiment of the interferometer, one of the optical paths includes a fiber polarization controller 150 and a fiber phase modulator (PM) 151. The second optical path includes a further fiber polarizing control (FPC) 152. The second optical path is coupled through a 3 dB coupler to the first optical path at the output of the phase modulator 151 to form the Mach-Zehnder interferometer. The output of the interferometer is connected through a fiber polarizing control 153 to a further fiber polarizing beam splitter 154, which together are adjusted to provide the $\pi/4$ phase shift according to Eqs. (8) and (9). The fiber polarization splitter 154 further splits the optical signal into two optical paths to a pair of photodetectors 155 and 156. The photodetectors 155 and 156 can be 1 GHz-bandwidth InGaAs PIN photodiodes operating at room temperature. The outputs of the photodetectors 155 and 156 are applied to a personal computer (PC) 157 which stores the signals. The personal computer 157 produces the extended key for controlling the phase modulator 151. The personal computer 157 produces an analog signal output that is coupled to the phase modulator 151 through an amplifier 158.

Figure 23:
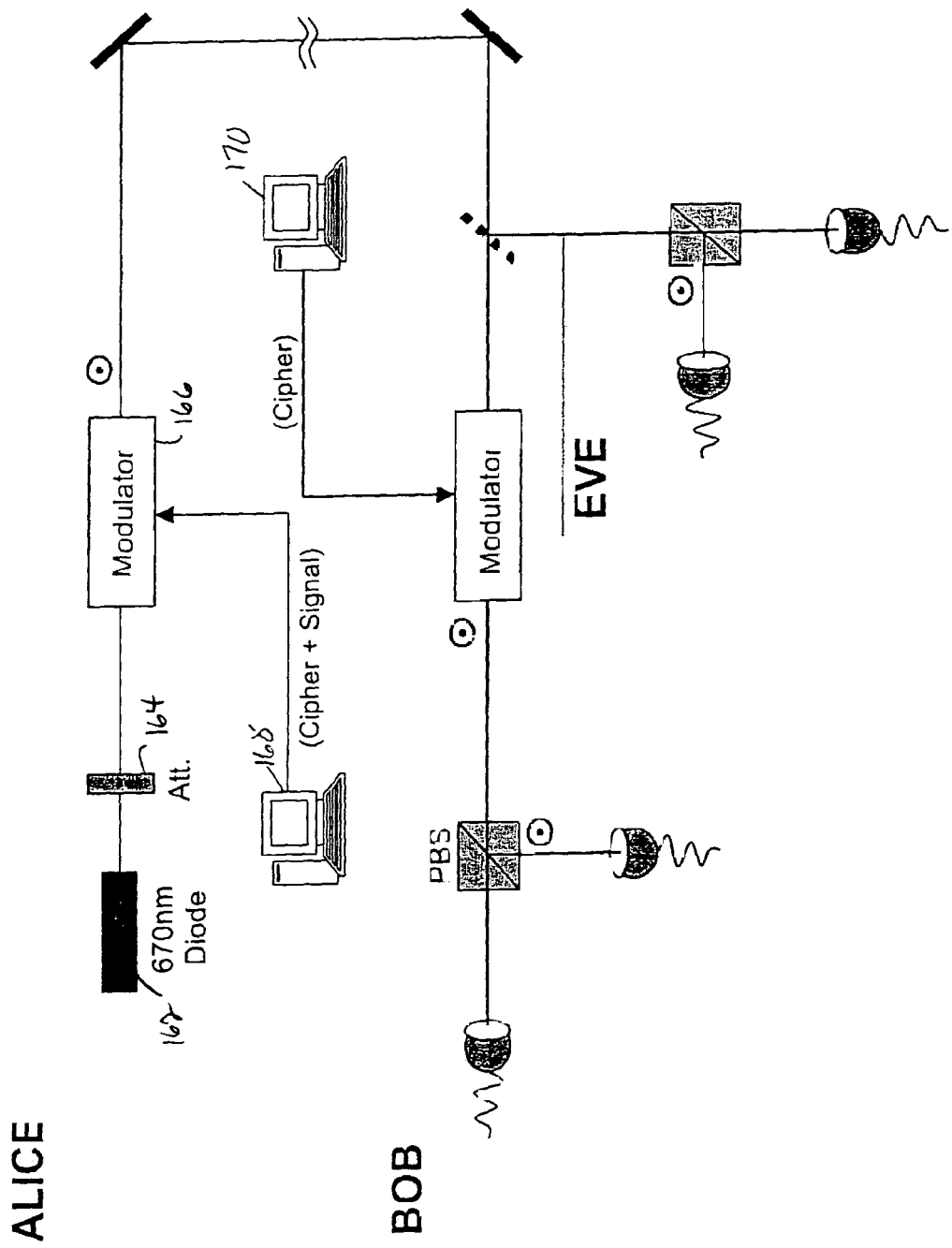
FIG. 23 is a schematic of a 200 kb/s free-space cryptography system provided by the present invention.

FIG. 23 is a schematic of a 200 kb/s free-space cryptography system provided by the present invention. The cryptography system 160 is similar to the cryptography system demonstrated in FIGS. 10 and 14. In this embodiment, the photon source 162 is a 670 nm laser diode, the output of which is coupled through an attenuator 164 to a modulator 166. The attenuator 164 allows adjustment of the power level of the light signal being supplied to the modulator 166. A computer 168 implements the LFSR to generate the extended key from the seed key, thus providing the cipher and the data drive signals for the modulator 166 to modulate the light to obtain the encrypted data. At the receiving location, a computer 170, running a similar LFSR provides the cipher for demodulating the optical signal to recover the plaintext from the encrypted data. FIG. 23 also shows an attacker, Eve, tapped into the optical signal path at the receiver location, but which would more typically be tapped into the optical path, in a similar manner, at or near the sending location.

Figure 24:
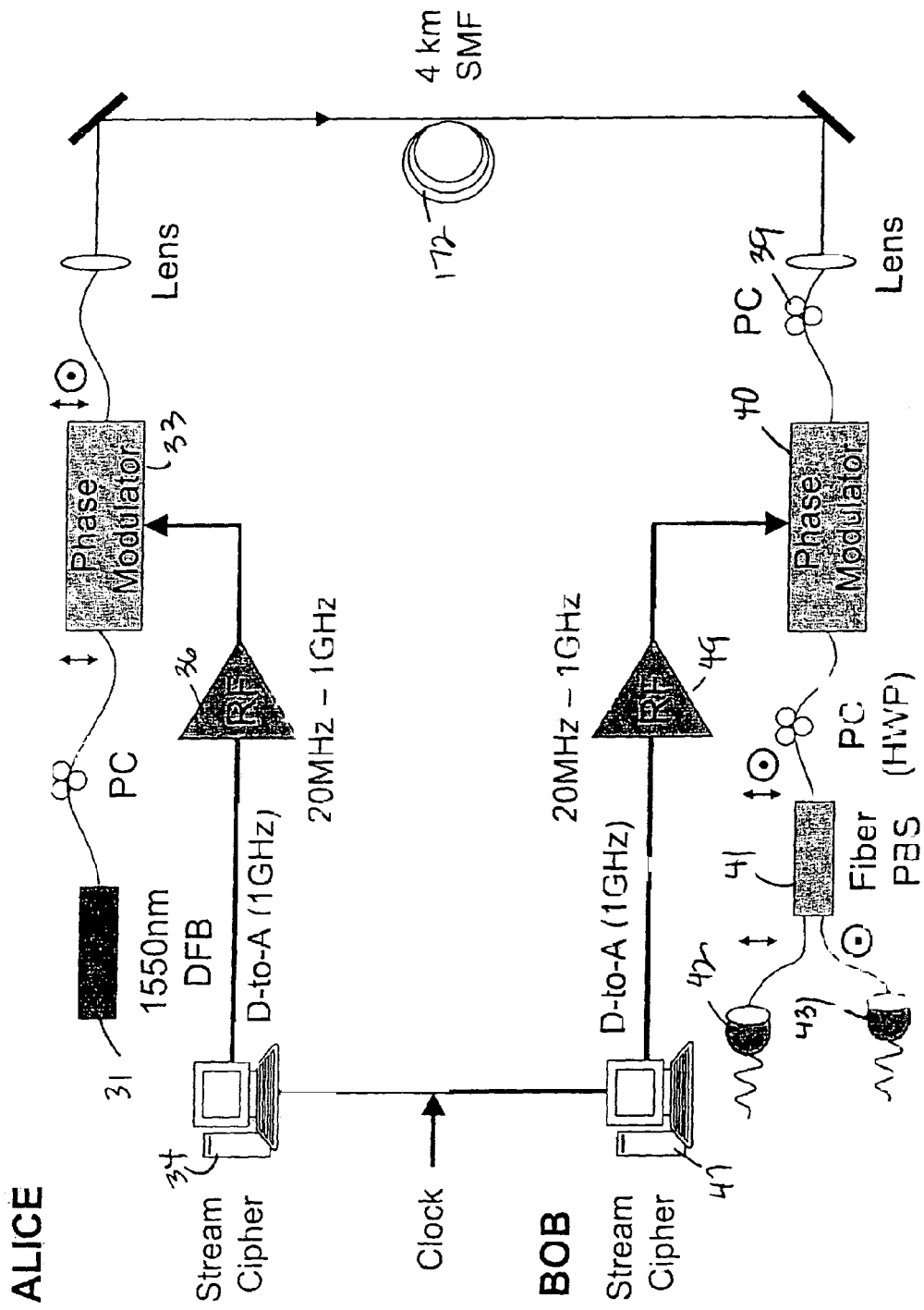
FIG. 24 is a schematic of a fiber-based polarization mode cryptography system provided by the present invention.

FIG. 24 is a schematic of a fiber-based polarization mode cryptography system provided by the present invention. The system of FIG. 24 is similar to that of FIG. 5, but further includes synchronization by interconnecting the computers. Accordingly, components of system have been given same reference numbers as corresponding components of the system of FIG. 5. Here the optical communication path is represented by a 4 km section of single mode fiber 172.

Figure 25:
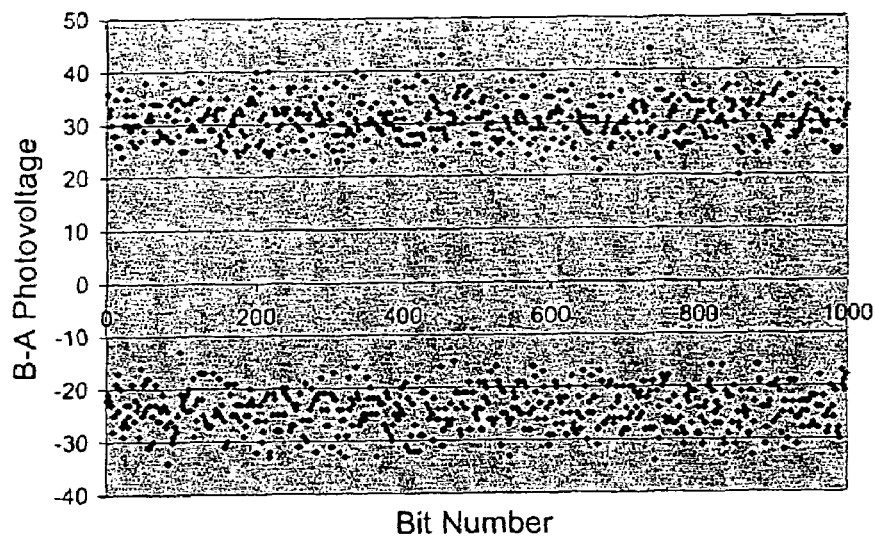
FIGS. 25 and 26 illustrate a sequence of bits transmitted from Alice to Bob and from Alice to Eve, respectively, for a 250 Mb/s quantum cryptography system provided by the present invention.
Figure 26:
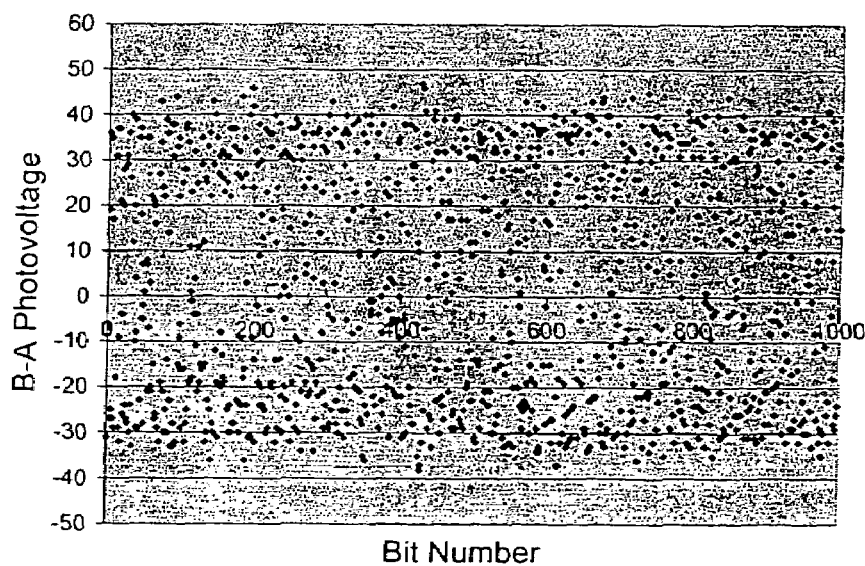

FIGS. 25 and 26 illustrate operation data for a 250 Mb/s quantum cryptography system provided by the present invention. FIG. 25 illustrates the difference of V and H counts (V−H) from Bob's receiver operating at 250 Mbs, with the average number of photons transmitted $<n>=|\alpha|^2=4000$ and M=4096. The plot shows the clear separation between the 0 and 1 bit values. The same sequence of bits as seen by Eve are shown in FIG. 26. All operating parameters are the same as for FIG. 25 except for Eve lacking the extended key K'. There is no clear separation between the 0 and 1 bit values in FIG. 26.

FIG. 27 is a schematic of a time-mode optical cryptography system 180 provided by the present invention and which is one realization of the system shown in FIG. 18. The system 180 provides a delayed signal channel which transmits an optical signal that is used as a time reference for recovering transmitted data from an optical carrier onto which the data is encrypted for transmission. In the system illustrated in FIG. 27, 182 consists of an integrated telecommunications laser and intensity modulator. The intensity modulator is clocked by a signal generated in a personal computer 184 and then amplified by a modulator driver 190. The system includes asymmetric optical path lengths including a long arm 185 and a short arm 186 which produce pulses in the long arm 185 delayed at least two pulse durations in time with respect to pulses in the short arm 186. The long arm includes a modulator 187 and a delay loop 188. The short arm includes a fiber polarization controller 189 to correct for polarization mismatch. The modulator 187 is driven by a signal provided by the computer 184 running the LFSR key extender, through a further modulator driver 190a, for modulating the optical pulses in the long arm 185 to encrypted data to be transmitted. The fiber optical channel 192 between the transmitting and receiving locations is embodied as a 50-75 km single mode fiber spool.

At the receiving location, the optical signal is passed through a fiber polarization controller 194 and applied to asymmetric optical paths including a long arm 195 and a short arm 196. The long arm 195 includes a delay loop 197 equal to the delay provided by 188, and a modulator 198 driven by a computer 200 to decrypt the arriving data. The short arm 196 includes a fiber polarization controller 202 to correct for polarization mismatch. The short arm 196 is coupled to the long arm 195 at a coupler 205. One of the outputs of the coupler 205 (label the optical coupler to the right of 204 as 205) is passed through an EDFA amplifier 204 to a photo-detector 206. The other output of 205 also passes through a similar EDFA and onto a similar photodiode that are not shown in FIG. 27.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method for achieving data encryption and/or key expansion/generation, said method comprising the steps of:
   providing a short, shared, secret, seed key between first and second parties, the seed key allowing the first and second parties to encrypt and decrypt messages transmitted between the first and second parties;
   extending the seed key to a long extended key;
   segmenting the extended key into disjointed blocks of running keys, using the running keys derived from the extended key to choose one of many possible quantum or classical signal sets embodied in a number of modes of electromagnetic or acoustic or other physical origins;
   adjusting the signal strength of each signal in the signal sets in accordance with the number of signal sets to obtain a desired security level, wherein quantum or classical noise in the system owing to use of at least 10 photons hides both encrypted data bits and the running key preventing a third eavesdropping party from success in compromising message transmissions between the first and second parties, and wherein the number of bases M for the signal coherent states is larger than the average number of photons $|\acute{\alpha}_0|$ used to encode a given bit value.

2. The method according to claim 1, wherein the signal sets are based on a number of modes of energy carrying waves either in free space or in guided media.

3. The method according to claim 2, wherein the energy bearing waves are electromagnetic waves, including radio waves, microwaves, millimeter waves, or light waves.

4. The method according to claim 2, wherein the modes are two modes of the light waves, and wherein the two modes of light waves are polarization modes, time or frequency modes, spatial modes or any combination of such physical attributes of the light waves.

5. The method according to claim 1, implemented over all types of networks, including enterprise, metro, short haul, and long haul, and independent of underlying software protocols.

6. A method for encrypting data, said method comprising the steps of:
   generating a large number of quantum signal sets of low to high energy;
   modulating the sets of quantum signal with the data being encrypted by using a multi-bit seed key suitably extended to obtain running keys to select quantum signal sets for different bit values, whereby each quantum signal set is encoded into a coherent state with at least 10 photons of an infinite-dimensional space or any other quantum state in space of any dimension; and wherein the number of bases M for the signal coherent states is larger than the average number of photons $|\acute{\alpha}_0|$ used to encode a given bit value.

7. The method according to claim 6, including the step of extending the multi-bit seed key K into a longer extended key K' and using the extended key K' to determine for each qumode carrying bit, b (0,1), which quantum signal set is to be used.

8. The method according to claim 7, wherein the extended key K' includes $2^s-1$ bits, where s is the number of bits of the seed key K, and wherein using the extended key K' to determine qumodes includes segmenting the extended key K' into disjointed blocks of r-bit running keys R, where $r=\log_2(M)$ and s>>r, wherein r is the number of bits of each of the running keys R, and M is the number of bases for the coherent states.

9. The method according to claim 6, wherein each quantum signal set is composed of any number of photons from small to large, and including the step of coding all of the photons of a given quantum signal set to represent a bit value for that quantum signal set.

10. A method for encrypting data, said method comprising the steps of:
   providing a multi-bit seed key;
   extending the multi-bit seed key K to produce a multi-bit extended key K', the length of the extended key being greater than the length of the seed key K;
   segmenting the extended key K' into a plurality of disjointed running keys R; and
   modulating an energy bearing wave carrying quantum or classical noise with at least 10 photons using the running keys R to select different bit values for different portions of the energy bearing wave to thereby encrypt the energy bearing wave with the data, and including the step of coding all of the photons of a given quantum signal set to represent a bit value for that quantum signal set, wherein the number of bases M for the signal coherent states is larger than the average number of photons $|\acute{\alpha}_0|$ used to encode a given bit value.

11. The method according to claim 10, wherein the energy bearing wave is an electromagnetic wave, including a radio wave, a microwave, a millimeter waves, or a light wave.

12. The method according to claim 10, wherein the extended key K' includes $2^s-1$ bits, where s is the number of bits of the seed key K.

13. The method according to claim 12, wherein the step of segmenting the extended key K' into blocks includes segmenting the extended key K into blocks of r-bit running keys R, where r is the number of bits of each of the running keys R, and S>>r.

14. A method for encrypting data, said method comprising the steps of:
   producing a light signal that includes a plurality of polarization-mode coherent states of light with at least 10 photons;
   extending a multi-bit seed key K to produce a multi-bit extended key K' the length of which is greater than the length of the seed key K;
   segmenting the extended key K' into a plurality of disjointed blocks of running keys R, each being r bits in length; and
modulating a finite number of the polarization-mode states of light using the running keys R to produce a multi-bit information bearing light signal with at least 10 photons, and including the step of coding all of the photons of a given quantum signal set to represent a bit value for that quantum signal set, wherein the number of bases M for the signal coherent states is larger than the average number of photons $|\alpha_0|$ used to encode a given bit value.

15. The method according to claim 14, wherein the polarization-mode states comprise two-mode coherent states of light, and including the step of using the extended key K' to determine, for each qumode carrying bit, b (0,1), which pair of signals is to be used.

16. The method according to claim 14, wherein each quantum signal set includes at least 1,000 photons, and including the step of coding all of the photons of a given quantum signal set to represent a bit value for that quantum signal set.

17. The method according to claim 14, wherein the extended key K' includes $2^s-1$ bits, where s is the number of bits of the seed key K.

18. The method according to claim 14, wherein signal components of the light signal are macroscopically distinguishable.

19. The method according to claim 14, wherein the extended key K' is segmented into disjointed blocks of r-bit running keys R, where $r=\log_2(M)$ and s>>r, r is the number of bits of each of the running keys R, and M is the number of bases.

20. A method for encrypting data, said method comprising the steps of:
   producing a light signal that includes two-mode coherent states of light with at least 10 photons;
   extending a multi-bit seed key K to produce a multi-bit extended key K', the length of which is greater than the length of the seed key K;
   segmenting the extended key K' into a plurality of disjointed blocks of running keys R, each of the running keys being r-bits in length; and
   modulating a finite number of the two-mode coherent states of light using the running keys R to produce a multi-bit information bearing light signal with at least 10 photons, and wherein the number of bases M for the coherent states of light is larger than the number of photons $|\alpha_0|$ used to encode a given bit value.

21. The method according to claim 20, wherein producing the light signal includes projecting light from a source of light equally into first and second polarization modes of light.

22. The method according to claim 21, wherein modulating the two-mode coherent states of light includes introducing a relative phase shift between the first and second polarization modes of light.

23. The method according to claim 21, wherein the relative phase shift introduced between the first and second polarization modes of light is in the range of $0$-$2\pi$ radians.

24. The method according to claim 20, wherein signal components of the light signal are macroscopically distinguishable.

25. The method according to claim 21, wherein the extended key K' includes $2^s-1$ bits, where s is the number of bits of the seed key K.

26. The method according to claim 25, wherein the number of bits r of each block is equal to $\log_2(M)$ and s>>r, where M is the number of bases formed by the first and second polarization states of light and s is the number of bits of the seed key K.

27. A method for transmitting data between first and second locations, said method comprising the steps of:
   encrypting data to be transmitted by
      producing at the first location a plurality of polarization-mode coherent states of light with at least 10 photons;
      extending a multi-bit seed key K to produce a multi-bit extended key K', the length of which is greater than the length of the seed key K;
   segmenting the extended key K' into a plurality of disjointed blocks of running keys R, each of the running keys being r-bits in length; and
   modulating a finite number of the polarization-mode coherent states of light with at least 10 photons using the running keys to produce a multi-bit information bearing light signal;
   transmitting the information bearing light signal over a communication channel from the first location to the second location; and
   decrypting the transmitted data at the second location including
      extending the same multi-bit seed key K at the second location to produce the extended key K', the length of which is greater than the length of the seed key K;
      segmenting the extended key K' into a plurality of disjointed blocks of running keys R, each of the running keys being r-bits in length;
      applying unitary transformations to the received polarization states according to the extended key K', wherein the relative phase shift introduced is determined by the extended key K' generated and applied to the information bearing light signal; and
processing the received information bearing light signal to cancel polarization rotation caused by communication channel, whereby after the phase shift has been applied, the relative phase shift between the first and second polarization modes is 0 or $\pi$ radians corresponding to logic 1 and logic 0 bits, respectively, according to the extended key K', and wherein each quantum signal set defines a bit value, and wherein the number of bases M for the signal coherent states is larger than the average number of photons $|\alpha_0|$ used to encode a given bit value.

28. The method according to claim 27, wherein each quantum signal set includes at least 1,000 photons, the photons of a given quantum signal set coded to represent a bit value for that quantum signal set.

29. The method according to claim 27, wherein each bit of the information bearing light signal is defined by a number of photons in the range of 1,000 to 100,000 photons.

30. The method according to claim 27, including amplifying the information bearing light signal as prior to processing the information bearing light signal at the second location.

31. The method according to claim 27, wherein extending the seed key includes using the seed key K to drive an encryption mechanism to produce the extended key K'.

32. A method for transmitting data, said method comprising the steps of:
    encrypting at a first location data to be transmitted by
        producing a light signal that includes two-mode coherent states of light with at least 10 photons;
        extending a multi-bit seed key K to produce a multi-bit extended key K', the length of which is greater than the length of the seed key K;
        segmenting the extended key K' into a plurality of disjointed blocks of running keys R, each of the running keys being r-bits in length; and
        modulating a finite number of the two-mode states of light using the running keys to produce a multi-bit information bearing light signal with at least 10 photons;
    transmitting the information bearing light signal, including the modulated polarization states of light from the first location to a second location through a communication channel; and
    decrypting the transmitted data at the second location including
        extending the same seed multi-bit K to produce the extended key K', the length of which is greater than the length of the seed key K;
        applying unitary transformations to the received polarization states according to the extended key by using a modulator to introduce relative phase shift determined by the extended key K' generated and applied to the information bearing light signal; and
        processing the information bearing light signal to cancel the polarization rotation caused by the communication channel, whereby after the phase shift has been applied, the relative phase shift between the polarization modes is 0 or n corresponding to logic 1 or
    logic 0 according to the extended key, and wherein the number of bases M for the signal coherent states is larger than the average number of photons $|\alpha_0|$ used to encode a given bit value.

33. The method according to claim 32, wherein the communication channel is a guided media.

34. The method according to claim 32, wherein producing the light signal includes projecting light from a source of light equally into two polarization modes of light.

35. The method according to claim 32, wherein modulating the two-modes states of light at the first location includes introducing a relative phase shift between the two polarization modes of light.

36. The method according to claim 35, wherein the relative phase shift introduced between the two polarization modes of light is in the range of 0-2π radians.

37. The method according to claim 36, including amplifying the information bearing light signal while the information bearing light signal is being transmitted from the first location to the second location.

38. The method according to claim 36, wherein a seed key K drives an encryption mechanism the output of which is a much longer extended key K' that is used to determine which pair of signals is to be used for each qumode carrying bit b (0,1).

39. The method according to claim 36, and including using a seed key extended to a longer key to modulate the parameters of a multi-mode coherent states of light.

40. The method according to claim 39, and including using an encryption mechanism to extend the short seed key K.

41. The method according to claim 36, wherein processing the light signal includes future rotating the received polarization states of light by an amount equal to π/4.

42. The method according to claim 36, wherein signals of each pair of light signals are macroscopically distinguishable.

43. A communication system comprising:
    means for generating a large number of quantum signal sets of low to high energy; and
    means for modulating the sets of quantum signal with the data being encrypted by using a multi-bit seed key to select quantum signal sets for different bit values, whereby each quantum signal set is encoded into a coherent state with at least 10 photons of an infinite-dimensional space, wherein the number of bases M for the signal coherent states is larger than the average number of photons $|\alpha_0|$ used to encode a given bit value.

44. The system according to claim 43, including means for extending the multi-bit seed key K into a much longer extended key K' that is used to determine for each qumode carrying bit b (0,1), which quantum signal set is to be used.

45. The system according to claim 44, wherein the extended key K' includes $2^s-1$ bits, where s is the number of bits of the seed key K.

* * * * *